US006361881B1

(12) United States Patent
Izaki et al.

(10) Patent No.: US 6,361,881 B1
(45) Date of Patent: Mar. 26, 2002

(54) PRESERVATIVE STEEL PLATE HAVING HIGH RESISTANCE WELDABILITY, CORROSION RESISTANCE AND PRESS FORMABILITY FOR AUTOMOBILE FUEL TANKS

(75) Inventors: Teruaki Izaki; Jun Maki; Masahiro Fuda; Nobuyoshi Okada; Takayuki Ohmori, all of Kitakyushu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/230,834

(22) PCT Filed: Jul. 31, 1997

(86) PCT No.: PCT/JP97/02673

§ 371 Date: Jan. 29, 1999

§ 102(e) Date: Jan. 29, 1999

(87) PCT Pub. No.: WO98/04760

PCT Pub. Date: May 2, 1998

(30) Foreign Application Priority Data

| | | |
|---|---|---|
| Jul. 31, 1996 | (JP) | 8-201769 |
| Aug. 29, 1996 | (JP) | 8-228078 |
| Oct. 30, 1996 | (JP) | 8-287997 |
| Dec. 11, 1996 | (JP) | 8-330673 |
| Mar. 27, 1997 | (JP) | 9-75459 |
| Mar. 31, 1997 | (JP) | 9-81290 |
| Mar. 31, 1997 | (JP) | 9-81291 |

(51) Int. Cl.[7] ............ B32B 15/08

(52) U.S. Cl. ............ 428/626; 428/34.1; 428/582; 428/615

(58) Field of Search ............ 428/626, 34.1, 428/457, 582, 615; 219/121.64; 280/830; 296/185; 220/581

(56) References Cited

U.S. PATENT DOCUMENTS 5,395,687 A * 3/1995 Totsuka et al. ............ 428/327

(List continued on next page.)

FOREIGN PATENT DOCUMENTS

EP 0344717 6/1989

(List continued on next page.)

OTHER PUBLICATIONS

Database Compendex 'Online! Engineering Information, Inc., New York, N.Y., U.S., Adonyi Y et al: "Resistance seam weldability of polymer–coated steel sheet" Database accession No. EIX93041463490 XP002138473 & SAE Trans; SAE (Society of Automotive Engineers) Transactions 1991 Publ. by SAE, Warrendale, Pa., USA, vol. 100, No. Sect. 5, 1991 pp. 199–207.

(List continued on next page.)

*Primary Examiner*—Deborah Jones
*Assistant Examiner*—Gwendolyn Blackwell-Radasill
(74) *Attorney, Agent, or Firm*—Kenyon & Kenyon

(57) ABSTRACT

A coating aluminized steel sheet suitable for fuel tanks, which comprises (a) a steel sheet, (b) an aluminized-plating layer formed on one or both sides of the steel sheet and based on aluminum or an aluminum alloy containing 2–15 wt% silicon, and (c) a coating layer formed on at least one of the aluminizing layers and selected from the group consisting of i) a resin chromate film having a film thickness of 0.1–2 $\mu$m and containing a resin and a chromic acid compound, with the resin/metal chromium weight ratio in the range of 0.5–18, ii) an inorganic-based chromate film with the coating layer formed to 10–200 mg/m$^2$ in terms of metallic chromium, which comprises 100 parts by weight of a chromic acid compound in terms of metallic chromium and 100–1000 parts by weight of colloidal silica, and further comprises any one or more of 100–600 parts by weight of a phosphoric acid compound, 10–200 parts by weight of a phosphonic acid or phosphonic acid salt compound and less than 50 parts by weight of a resin, and iii) an inorganic-based chromate film with a coating amount of at least 10 mg/m$^2$ and less than 35 mg/m$^2$ in terms of metallic chromium. There are provided automobile fuel tanks with excellent durability, forming formability and weldability, and a seam welding process for fuel tanks.

30 Claims, 7 Drawing Sheets

U.S. PATENT DOCUMENTS

| | | | | | |
|---|---|---|---|---|---|
| 5,674,627 | A | * | 10/1997 | Uesugi et al. | 428/461 |
| 5,789,089 | A | * | 8/1998 | Maki et al. | 428/623 |
| 5,828,033 | A | * | 10/1998 | Mitsuyoshi et al. | 219/121.64 |

FOREIGN PATENT DOCUMENTS

| | | |
|---|---|---|
| EP | 0497560 | 8/1992 |
| EP | 0743373 | 11/1996 |
| EP | 0870847 | 10/1998 |
| JP | 55-152184 | 11/1980 |
| JP | 57-61833 | 12/1982 |
| JP | 58-6976 | 1/1983 |
| JP | 58-48679 | 3/1983 |
| JP | 60-56072 | 4/1985 |
| JP | 61-136685 | 6/1986 |
| JP | 62-120494 | 6/1987 |
| JP | 62-230987 | 10/1987 |
| JP | 63-93889 | 4/1988 |
| JP | 63-103096 | 5/1988 |
| JP | 3-39485 | 2/1991 |
| JP | 4-63399 | 11/1992 |
| JP | 6-128713 | 5/1994 |
| JP | 6-306637 | 11/1994 |
| JP | 7-180065 | 7/1995 |
| JP | 9-53166 | 2/1997 |
| JP | 63-270480 | 11/1998 |

OTHER PUBLICATIONS

Patent Abstracts of Japan, vol. 1995, No. 02, Mar. 31, 1995 & JP 06 306637 A (NIPPON STEEL CORP.), Nov. 1, 1994.

Patent Abstract of Japan, vol. 1998, No. 09, Jul. 31, 1998 & JP 10 095436 A (NISSHIN STEEL CO. LTD.), Apr. 14, 1998.

* cited by examiner

Fig. 2

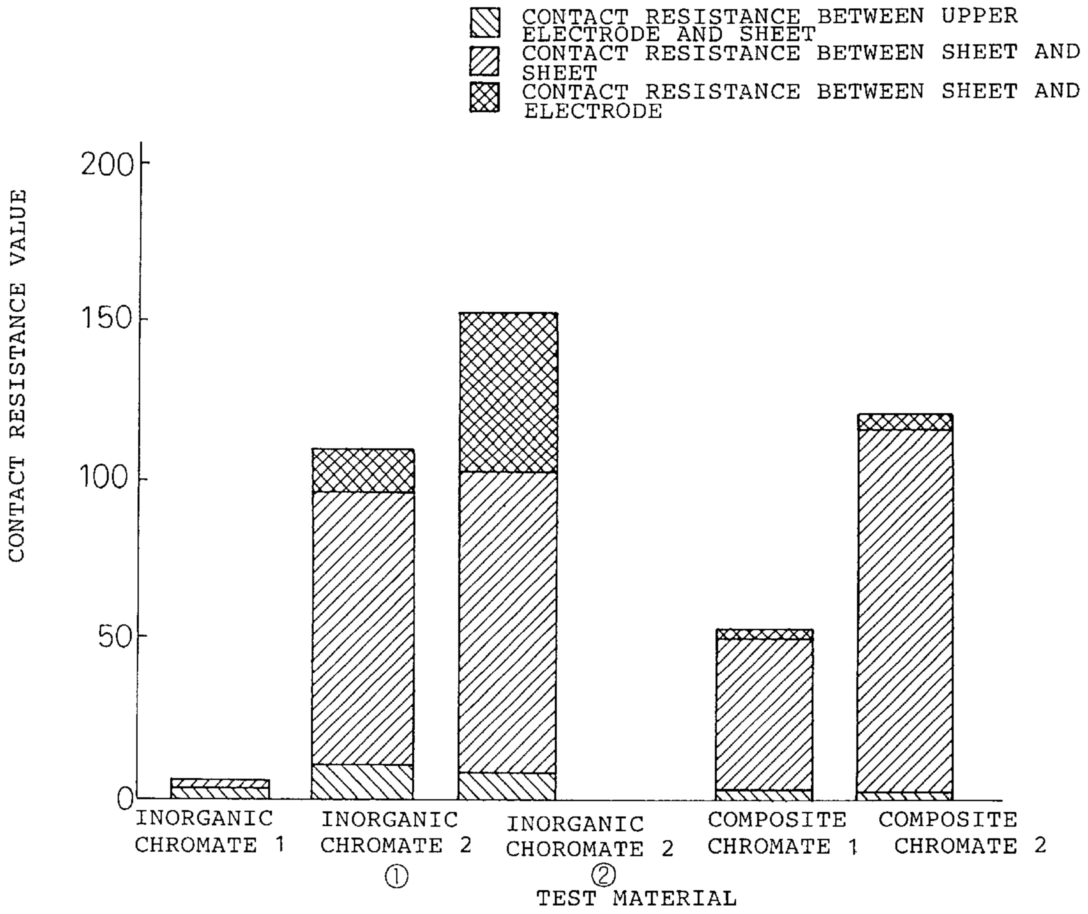

- INORGANIC CHROMATE 1: COMPARATIVE EXAMPLE I SOLUTION, AMOUNT OF PLATING (Cr CONTENT ): 20 mg/m²
- INORGANIC CHROMATE 2 ①: COMPARATIVE EXAMPLE I SOLUTION, AMOUNT OF PLATING (Cr CONTENT): 150 mg/m²
- INORGANIC CHROMATE 2 ②: COMPARATIVE EXAMPLE I SOLUTION, AMOUNT OF PLATING (Cr CONTENT): 150 mg/m²
- COMPOSITE CHROMATE 1: EXAMPLE C SOLUTION, AMOUNT OF PLATING(Cr CONTENT): 30 mg/m²
- COMPOSITE CHROMATE 2: EXAMPLE E SOLUTION, AMOUNT OF PLATING(Cr CONTENT): 120 mg/m²

Fig.6A

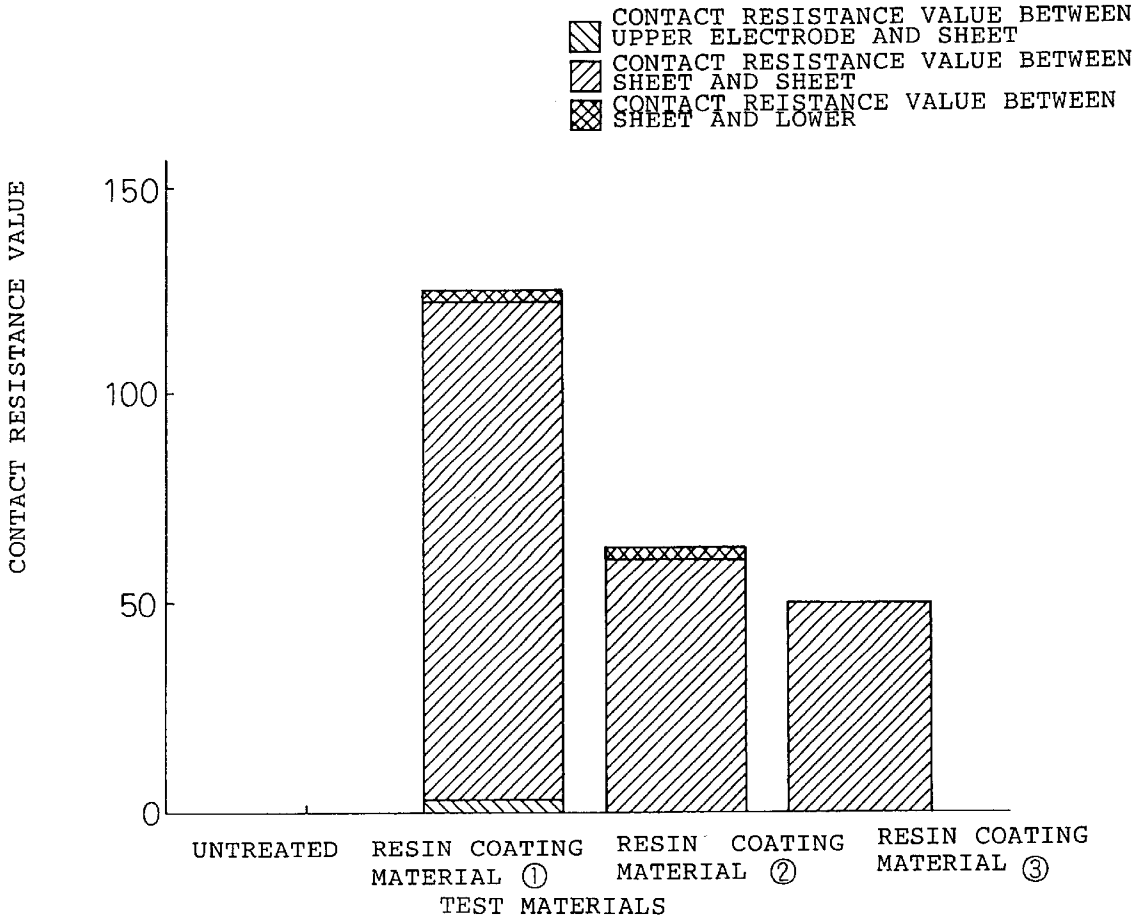

- RESIN COATING MATERIAL ① : COMBINATION OF BOTH-SIDE RESIN COATED MATERIALS ( 1 μm EPOXY RESIN)
- RESIN COATING MATERIAL ② : COMBINATION OF ONE-SIDE COATED MATERIAL ( 1 μm EPOXY RESIN, STEEL SHEET SIDE) AND ONE-SIDE COATED MATERIAL (1 μm EPOXY RESIN, ELECTRODE SIDE)
- RESIN COATING MATERIAL ③ : COMBINATION OF ONE-SIDE COATED MATERIAL (1 μm EPOXY RESIN, STEEL SHEET SIDE) AND UNTREATED MATERIAL

PRESERVATIVE STEEL PLATE HAVING HIGH RESISTANCE WELDABILITY, CORROSION RESISTANCE AND PRESS FORMABILITY FOR AUTOMOBILE FUEL TANKS

TECHNICAL FIELD

The present invention relates to a rustproof steel sheet for automobile fuel tanks which has excellent resistance weldability, corrosion resistance and press formability. The invention further relates to an automobile fuel tank with excellent corrosion resistance and to a seam welding process for automobile fuel tanks.

BACKGROUND ART

Automobile fuel tanks usually have a final design which is in conformity with the design of automobile bodies, and their shapes therefore tend to be very complicated. Their structure includes, as shown in FIG. 1, a fuel supply opening 3, a fuel supply pump (not shown), a fuel hose 4, the fuel hose 4 serving to return excess fuel 6, separators 5 to prevent the sound of fuel waves, etc. The fuel tank body 1 consists of a pair of bowl-shaped molds formed into an integral whole by seam-welding the flange members 2. Each of the parts are bonded by spot welding, soldering or brazing.

This fuel tank is an important member of the automobile from a safety standpoint, and it is required to possess the features of sufficient corrosion resistance against fuel, leakproofness and impermeability to fuel, and also low fatigue after forming and resistance to cracking by impacts. The corrosion resistance is of course to eliminate the concern of corrosion holes, but it is also important in terms of preventing production of abundant corrosion products which lead to clogging of the filter at the inlet of the fuel pump in the fuel tank.

Various modifications have been made in the materials, manufacture and manufacturing processes to obtain fuel tanks with such properties. As a result of modifications in the materials, it has become common to employ fuel tanks made of Pb—Sn plated steel sheets which have sufficient corrosion resistance against fuel, low generation of corrosion products and easier welding and soldering suitability for better production efficiency (Japanese Examined Patent Publication No. 57-61833). However, Pb is a metal which is detrimental to the environment, as is well known. Also, while Pb—Sn plated steel sheets are well suited for soldering and brazing as mentioned above, the soldering component is an Sn—Pn system which of course contains Pb. Consequently, with recent demands for fuel tanks which employ absolutely no Pb, fuel tanks made of Al—Si based alloy plated (hereunder, "aluminized") steel sheets have become a focus of study as candidate substitutes.

Aluminized steel sheets are one type of material which utilize no Pb and have satisfactory corrosion resistance and workability. Aluminizing forms a stable oxide film on the surface, and therefore provides satisfactory corrosion resistance against not only gasoline but also alcohol and organic acids produced by degradation of gasoline. However, several problems arise when aluminized steel sheets are used as fuel tank materials. One of these is workability, and aluminized steel sheets (especially hot dip aluminized steel sheets) are susceptible to plating layer peel and plating layer cracks originating from sections of very hard Fe—Al—Si intermetallic compounds (hereunder referred to as the "alloy layer") produced at the interface between the coated layer and the steel sheet. The present inventors have dealt with this issue in Japanese Patent Application No. 7-329193, disclosing that it can be overcome by adjusting the cooling rate and reheating after plating. Another problem is weldability. Specifically, although aluminized steel sheets are suitable for resistance welding such as spot welding and seam welding, the coated Al metal has high affinity for Cu which is usually used as the electrode, and forms brittle Al—Cu or Al—Cu—Fe alloys on the electrode surface during welding, thus resulting in the problem of gradual loss during continuous operation and early welding defects.

Aluminized steel sheets have been conventionally used after being subjected to chromate treatment, mainly with chromic acid and silica, for the purpose of improving corrosion resistance, and disclosed instances thereof include Japanese Examined Patent Publication No. 4-68399, Japanese Unexamined Patent Publication No. 58-6976, Japanese Unexamined Patent Publication No. 58-48679 and Japanese Unexamined Patent Publication No. 60-56072. All of these methods, however, contribute little to improvement in continuous operation because the reactions with the electrode are virtually the same as with untreated materials. The process of Japanese Examined Patent Publication No. 4-68399 is characterized by forming the coating to 35–70 $mg/m^2$ in terms of Cr, but although corrosion resistance of the fuel tank is achieved with this amount of coating, there is a disadvantage for spot welding and seam welding, in that the Al in the plating layer tends to form alloys with the electrode Cu as with untreated materials, so that the electrode tip becomes alloyed during continuous operation thus shortening the life of the electrode. In addition, if the brazing material is not carefully selected, the wettability of the brazing material will be lower resulting in the problem of a more difficult brazing operation, and tanks with brazed pipes, etc. will be difficult to manufacture. Japanese Unexamined Patent Publications No. 58-6976 and No. 58-48679 disclose processes characterized by the amount of chromate coating of 5–40 $mg/m^2$ in terms of Cr and organic silicon water repellent treatment, but in addition to the same problems with resistance welding as Japanese Examined Patent Publication No. 4-68399, the corrosion resistance for fuel tanks is poor at less than 10 $mg/M^2$ even with organic silicon water repellents, and the corrosion resistance against organic acids produced by degradation of gasoline fuel is insufficient. Also, as in Japanese Examined Patent Publication No. 4-68399, despite the improved corrosion resistance at 35 $mg/m^2$ and greater, failure to carefully select the brazing material will result in a lower wettability of the brazing material, thus complicating the brazing operation. Another disadvantage is that in spot welding and seam welding, the Al in the plating layer tends to form alloys with the electrode Cu as with untreated materials, so that the electrode tip becomes alloyed during continuous operation thus shortening the life of the electrode. The process in Japanese Unexamined Patent Publication No. 60-56072 is characterized by the amount of chromate coating of less than 10 $mg/m^2$, and thus its drawback is that it cannot provide the weldability or the corrosion resistance required for fuel tanks. With these conventional techniques, it has been difficult to satisfactorily achieve the resistance weldability, continuous operation and corrosion resistance required for production of fuel tanks.

It is an object of the present invention to provide an aluminized steel sheet for a fuel tank material, which improves resistance weldability over rustproof steel sheets for fuel tanks for which conventional aluminized steel sheets have not been suitable, as well as satisfactory press formability and corrosion resistance.

It is another object of the invention to provide a novel fuel tank which is environmentally friendly by not using Pb, and which has excellent corrosion resistance in environments of gasoline and other fuels.

It is yet another object of the invention to provide a seam welding process by which it is possible to achieve improved resistance weldability over rustproof steel sheets for fuel tanks for which conventional aluminized steel sheets have not been suitable, as well as continuous operation.

DISCLOSURE OF THE INVENTION

The present invention provides the following in order to attain the objects described above.

(1) A coating aluminized steel sheet suitable for fuel tanks, which comprises (a) a steel sheet, (b) an aluminizing layer formed on one or both sides of the steel sheet and based on aluminum or an aluminum alloy containing 2–15 wt % silicon, and (c) a coating layer formed on at least one of the aluminizing layers and selected from the group consisting of i) an organic and inorganic composite chromate film having a film thickness of 0.1–2 μm and containing a resin and a chromic acid compound, with the resin/metal chromium weight ratio in the range of 0.5–18, ii) an inorganic-based chromate film A with the coating layer formed to 10–200 mg/m$^2$ in terms of metallic chromium, which comprises 100 parts by weight of chromic acid in terms of metallic chromium and 100–1000 parts by weight of colloidal silica, and further comprises at least one selected from the group consisting of 100–600 parts by weight of a phosphoric acid compound, 10–200 parts by weight of a phosphonic acid or phosphonic acid salt compound and less than 50 parts by weight of an organic resin, and iii) an inorganic-based chromate film B with a coating amount of at least 10 mg/m$^2$ and less than 35 mg/m$^2$ in terms of metallic chromium.

(2) A coating aluminized steel sheet according to (1) above, wherein the aluminizing layer is formed to 60 g/m$^2$ or less.

(3) A coating aluminized steel sheet according to (1) or (2) above, wherein the composite chromate film further contains 0.5–20 wt % of a lubricant.

(4) A coating aluminized steel sheet according to (1), (2) or (3) above, wherein the composite chromate film further contains 100–600 parts by weight of a phosphoric acid compound and 100–1000 parts by weight of colloidal silica with respect to 100 parts by weight of metallic chromium.

(5) A coating aluminized steel sheet according to (4) above, wherein the composite chromate film further contains 10–200 parts by weight of a phosphonic acid or phosphonic acid salt compound with respect to 100 parts by weight of metallic chromium.

(6) A coating aluminized steel sheet according to any of (1) to (5) above, which has the aluminizing layer on both sides of the steel sheet and which has the composite chromate film on the aluminizing layers on both sides.

(7) A coating aluminized steel sheet according to (1) or (2) above, which has the aluminizing layer on both sides of the steel sheet, and which has the inorganic-based chromate film A) on the aluminizing layers on both sides.

(8) A coated aluminized steel sheet according to any of (1) to (5) above, which has the aluminizing layer on both sides of the steel sheet and which has the composite chromate film on the aluminizing layer on one side and an inorganic-based chromate film C with a coating amount of 200 mg/m$^2$ or less in terms of metallic chromium on the aluminizing layer on the other side.

(9) A coating aluminized steel sheet according to (8) above, wherein the inorganic-based chromate film C formed on the aluminizing layer further contains at least one selected from the group consisting of phosphoric acid compounds, phosphonic acid and phosphonic acid salt compounds, and less than 50 parts by weight of a resin with respect to 100 parts by weight of metallic chromium.

(10) A coating aluminized steel sheet according to (1) or (8) above, which has an inorganic-based chromate film C at 100 mg/m$^2$ or less in terms of metallic chromium between the aluminizing layer and the composite chromate film.

(11) A coating aluminized steel sheet according to (10), wherein the inorganic-based chromate film C formed between the aluminizing layer and the composite chromate film further contains at least one selected from the group consisting of phosphoric acid compounds, phosphonic acid and phosphonic acid salt compounds, and less than 10 parts by weight of a resin with respect to 100 parts by weight of metallic chromium.

(12) A coating aluminized steel sheet according to (1) above, which has the aluminizing layer on both sides of the steel sheet, and which has the inorganic-based chromate film B formed to 10–35 mg/m$^2$ in terms of metallic chromium on the aluminizing layers on both sides.

(13) A coating aluminized steel sheet according to any of (1) to (5) above, which has the aluminizing layer on both sides of the steel sheet, and which has the composite chromate film on the aluminizing layer on one side and an inorganic resin film with a thickness of 0.1–2.0 μm on the aluminizing layer on the other side.

(14) A coating aluminized steel sheet according to (13) above, which has an inorganic-based chromate film C at 100 mg/m$^2$ or less in terms of metallic chromium between the aluminizing layer and the composite chromate film and/or the organic resin film.

(15) A coating aluminized steel sheet according to (14), wherein the inorganic-based chromate film C formed on the aluminizing layer further contains at least one selected from the group consisting of phosphoric acid compounds, phosphonic acid and phosphonic acid salt compounds, and less than 50 parts by weight of a resin with respect to 100 parts by weight of metallic chromium.

(16) A coating aluminized steel sheet according to (1) above, which has the aluminizing layer on both sides of the steel sheet and which has the inorganic-based chromate film B) on the aluminizing layer on one side and an organic-based resin film on the aluminizing layer on the other side.

(17) A coating aluminized steel sheet according to (16), wherein the inorganic-based chromate film B) is formed to 200 mg/m$^2$ in terms of metallic chromium.

(18) A coating aluminized steel sheet according to (17), wherein the inorganic-based chromate film B formed on the aluminizing layer further contains at least one selected from the group consisting of phosphoric acid compounds, phosphonic acid and phosphonic acid salt compounds, and less than 50 parts by weight of a resin with respect to 100 parts by weight of metallic chromium.

(19) A coating aluminized steel sheet according to (17) above, which has an inorganic-based chromate film C at 100 mg/m$^2$ or less in terms of metallic chromium between the aluminizing layer and the organic resin film.

(20) A coating aluminized steel sheet according to (19), wherein the inorganic-based chromate film C formed between the aluminizing layer and the organic resin film further contains at least one selected from the group consisting of phosphoric acid compounds, phosphonic acid and phosphonic acid salt compounds, and less than 5 parts by weight of a resin with respect to 100 parts by weight of metallic chromium.

(21) A fuel tank produced with a coating aluminized steel sheet according to any of (1) to (20) above.

According to the invention, the following are particularly provided as automobile fuel tanks with excellent corrosion resistance.

(22) An automobile fuel tank wherein a pair of bowl-shaped bodies with flanges are integrated by continuous seam-welding of the flange substances, the automobile fuel tank being characterized in that the materials of which the bowl-shaped bodies are made are coating aluminized steel sheets which consist of aluminized steel sheets each having on one or both sides an aluminizing layer based on aluminum or an aluminum alloy containing 2–13 wt % silicon, and having a resin coating on the uppermost surface of the inner and/or outer side.

(23) An automobile fuel tank according to (22) above, wherein the resin coating is an organic and inorganic composite chromate film consisting of a mixture of a resin and a chromic acid compound.

(24) An automobile fuel tank according to (22) above, wherein the resin coating has a thickness of 0.1–2 $\mu$m.

(25) An automobile fuel tank according to (22) above, wherein the coating aluminized steel sheets are coating aluminized steel sheets according to any one of (1) to (20) above.

The present invention still further provides the following as seam welding processes for fuel tanks.

(26) A seam welding process for fuel tanks, in which two coating aluminized steel sheets are combined which are aluminized steel sheets each having formed on one or both sides an aluminizing layer based on aluminum or an aluminum alloy containing 2–13 wt % silicon and having a resin coating formed on the one or both sides thereof, wherein the coating aluminized steel sheets have their aluminizing layer at least on the side corresponding to the inner side of the fuel tank, a resin film is provided on at least one of the steel sheet surfaces at the side where the steel sheets meet and/or on at least one of the steel sheet surfaces at the side where it will contact with an electrode wheel, and the two combined steel sheets are then seam welded between a pair of electrode wheels.

(27) The process according to (26) above, wherein the resin film contains a chromic acid compound at 10–200 mg/m$^2$ in terms of metallic chromium.

(28) The process according to (27) above, wherein the resin film has a thickness of 0.1–2 $\mu$m.

(29) The process according to (26) above, wherein the resin film formed on the surface of the aluminized steel sheet is an organic and inorganic composite chromate film according to (1) above.

(30) The process according to (26) above, wherein the coating aluminized steel sheet is a coating aluminized steel sheet according to any one of (1) to (11) or (13)–(20) above.

BRIEF DESCRIPTION OF THE DRAWINGS

FIG. 2 is a bar graph showing the contact resistance values for an inorganic chromate film according to the prior art and an organic and inorganic composite chromate film according to the invention.

BEST MODE FOR CARRYING OUT THE INVENTION

Coated Aluminized Steel Sheet

Figure 1:
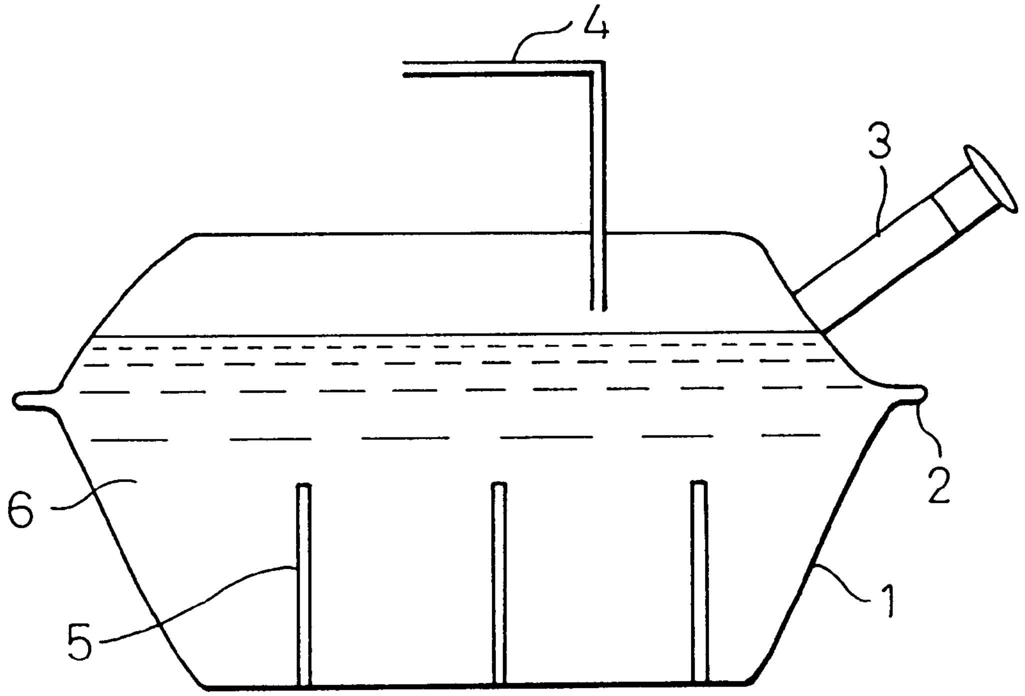
FIG. 1 shows an overview of the structure of an automobile fuel tank.

The coated aluminized steel sheet of the invention is characterized in that on the surface of one or both sides of an aluminized steel sheet there is formed i) an organic and inorganic composite chromate film, ii) an inorganic-based chromate film A or iii) an inorganic chromate film B, which are explained below, and it is particularly suitable for use in automobile fuel tanks.

The composition of the plated sheet used is not particularly restricted. However, IF steel (ultra low-carbon sheet steel) which has excellent workability is preferred only at the sections which require high workability, and B (boron) is preferably added to the steel sheet at a few ppm to ensure airtightness and secondary workability after welding.

The process for producing the steel sheet may be a common employed one. For example, the steel component may be modified by conversion-vacuum degassing processing to form an ingot, and a steel billet may be produced therefrom by continuous founding, etc. and then hot rolled. The conditions for hot rolling or subsequent cold rolling will affect the deep drawing properties of the steel sheet. For especially superior deep drawing properties, the heating temperature during hot rolling should be as low as about 1150° C., the finishing temperature for hot rolling as low as about 800° C., the coiling temperature as high as 600° C. or above, and the cold rolling draft as high as about 80%.

The reasons for the restrictions on the aluminizing layer will now be explained. The plating layer may be Al alone, but Si is preferably added. Regarding the Si content in the plated coating layer, this element is usually added at about 10% for the purpose of thinning the alloy layer. As mentioned above, alloy layers produced by hot dip aluminizing are extremely hard and brittle and thus tend to form breaking origins, thus also impairing the ductility of the steel sheet itself. Even with common alloy layers of about 2–3 $\mu$m, the ductility is reduced by about 3 points. Consequently, a thinner alloy layer will function more advantageously when worked. If the Si is not added to at least 2% the alloy layer-reducing effect will be weaker, and if added to over 15% the effect will be saturated, while the tendency for Si to act as an electrochemical cathode will lower the corrosion resistance of the plating layer with the greater Si content. For these reasons, the Si content is limited to 2–15%. The preferred lower limit is 3%, and the preferred upper limit is 13%.

According to the invention, hot dip aluminizing is preferred.

Furthermore, while a greater plating amount of plating will improve the corrosion resistance, it will reduce the plating adhesion and weldability. When applying hot dip aluminized steel sheets as fuel tank materials which require different types of welding, it is important to ensure weldability and therefore the maximum amount of plating is 60 $g/m^2$ per side. It is preferably no greater than 50 $g/m^2$ and more preferably no greater than 40 $g/m^2$, per side. There are no particular restrictions on the other conditions for the aluminizing. However, a smaller alloy layer thickness is preferred, as mentioned above.

After-processing which follows the hot dip plating may include zero spangling (minimized spangling) for a uniform outer appearance after hot dip plating, annealing for modification of the plating, and tempered rolling for adjustment of the surface condition and quality, but according to the invention any process may be applied without any limitation to these.

(First embodiment)

According to a first embodiment of the coating aluminized steel sheet of the invention, an organic and inorganic composite chromate film (hereunder referred to simply as "composite chromate film") is formed on the aluminizing layer on one or both sides of the aluminized steel sheet.

Here, an organic and inorganic composite chromate film is a film which is a mixture of an organic resin and an inorganic chromic acid compound, and the term encompasses a wide range including films modified by addition of resins, which have the basic properties of a resin film but with a chromic acid compound (chromic acid, chromic anhydride, chromic acid salt, chromic acid ester, chromic acid ion compound, etc. but especially a chromic acid salt) dispersed in a resin matrix, so that properties similar to those of an inorganic-based chromate film are retained.

The present inventors have conducted much research on after-processing of aluminized steel sheets with excellent weldability, formability and corrosion resistance, and as a result we have resolved the aforementioned issue of continuous operation during welding by suitably forming on the surface a film having a chromate film structure which comprises an organic and inorganic composite chromate film consisting of an appropriate combination of an inorganic component such as a chromic acid compound or silica and an organic component such as a resin, and we have found that such products have excellent properties for fuel tanks.

As mentioned above, the steel sheet coating metal, Al, readily reacts with the Cu electrode, resulting in the problem of more rapid electrode loss and poorer continuous operation. Accordingly, there are 2 important objects for improved continuous operation: minimizing the electrode loss and increasing the contact resistance value between the steel sheets in order to form more efficient nuggets. The present inventors have discovered that an organic and inorganic composite chromate film can be effectively employed for this purpose, and the present invention has thus been completed.

Although the mechanism is not yet completely understood, it is theorized that there is an effect of Cr in addition to the contact resistance increase by mere resin application. The organic resin-rich composite chromate treatment employs a chromic acid compound in the form of an aqueous solution, so that Cr is uniformly distributed throughout the coating, and this is also believed to contribute to the improved weldability.

Figure 3:
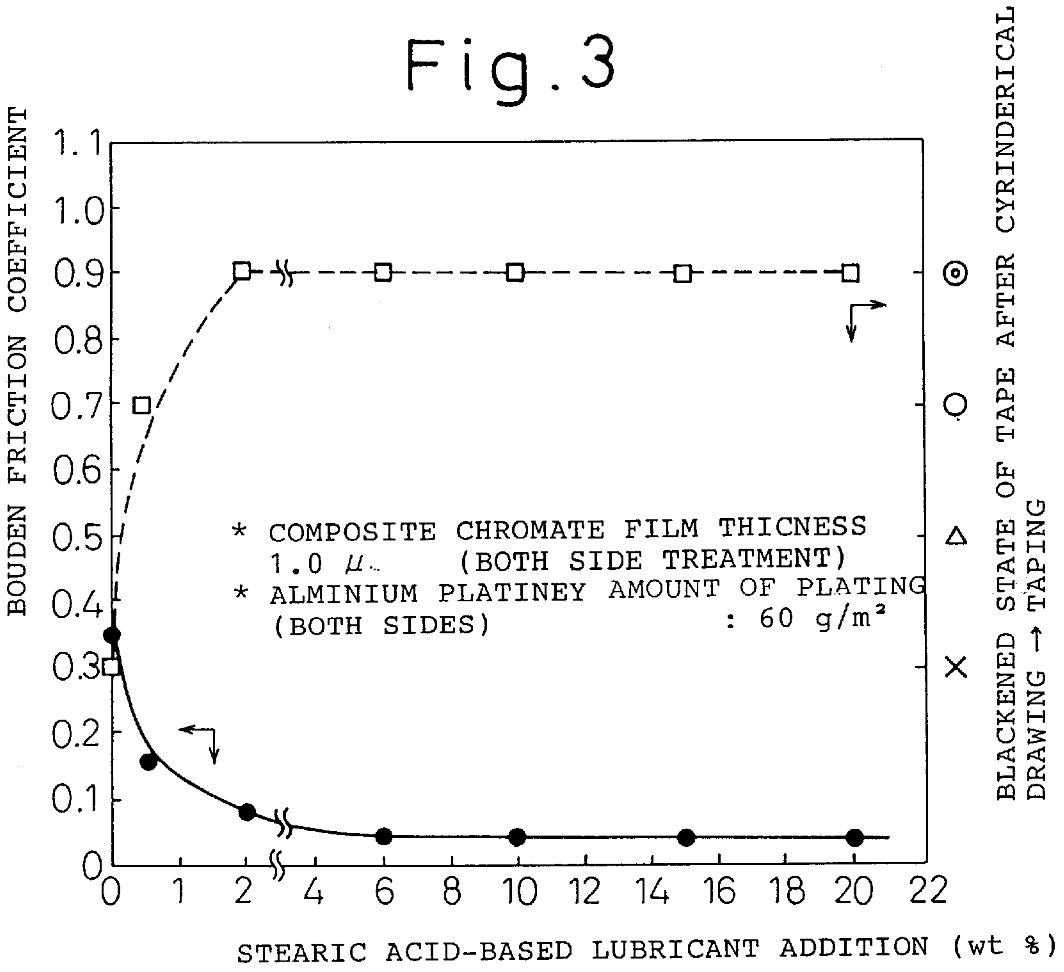
FIG. 3 is a graph showing stearic acid lubricant additive contents and Bowden friction coefficients, with the blackened state of tape applied to the external side after cylindrical drawing.

In other words, a film constructed only with the inorganic components of chromic acid compounds and silica, having an amount of coating as of conventional chromate treatment as shown in FIG. 3, gives a contact resistance value between steel sheets, which is not unlike that of untreated materials, and thus like untreated materials, the plating Al and the electrode Cu react during welding so that there is no increase in the usable life of the electrode. Conversely, if the amount of coating is increased, a harder and brittler inorganic film results, and therefore despite the higher contact resistance value, local breakage of the film occurs and the contact resistance value varies drastically because of non-uniformity of weld current passing points between sheet and electrode, so that no reduction in electrode loss can be expected. Another problem is that local over-current passing between the sheet and electrode tends to produce explosion.

In contrast, addition of an organic component is believed to increase the tenacity of the film and eliminate local breakage of the film and variations in forming the weld current passing point, thus facilitating formation of uniform weld current passing points between sheet and electrode as compared with films comprising only inorganic components. Thus, even though a high contact resistance value between sheets is obtained, the contact resistance value between sheet and electrode is uniformly low (FIG. 2), thus providing satisfactory nugget-forming properties and an electrode loss minimizing effect. These effects are greatest when both sides are treated, but an effect is still exhibited when one side is treated.

FIG. 2 shows the contact resistance values between upper electrode and sheet, the contact resistance values between sheet and sheet and the contact resistance values between sheet and lower electrode for different sample steel sheets, and the samples are the following listed in Examples 29–50.

Inorganic chromate 1: Comparative Example I solution, the amount of coating (Cr content): 20 $mg/m^2$.

Inorganic chromate 2①: Comparative Example I solution, the amount of coating (Cr content): 150 $mg/m^2$.

Inorganic chromate 2②: Comparative Example I solution, the amount of coating (Cr content): 150 $mg/m^2$.

Composite chromate 1: Example C solution, the amount of coating (Cr content): 30 $mg/m^2$.

Composite chromate 2: Example E solution, the amount of coating (Cr content): 120 $mg/m^2$.

With this type of resin-rich chromate film, it is possible to accomplish the treatment with one less step compared to resin coating treatment after chromate treatment, which is the standard organic coating treatment, and it is therefore a more advantageous treatment in terms of cost. In addition, by using a low temperature curable resin, there is a further advantage in that no special dry furnace is necessary and treatment is possible with conventional chromate treatment equipment.

Changes in the composition of this composite chromate film which has excellent weldability in terms of the resin/chromium weight ratio after curing will alter the performance of the film. For example, a low resin/chromium ratio (weight ratio) will tend to result in poorer weldability since the proper contact resistance value will not be obtained. On the other hand, a larger resin/chromium ratio will reduce the corrosion resistance and somewhat impair the weldability. Consequently, the post-curing weight ratio value for the resin/chromium ratio of the composite chromate film for this purpose is preferred to be about 0.5–18.

The chromium or chromic acid compound used according to the invention may be either or both chromic anhydride or a reduced aqueous chromic acid solution with an adjusted $Cr^{3+}/Cr^{6+}$ compositional ratio by reaction of an aqueous chromic acid solution with a reducing agent. When reduced chromic acid is used, the reducing agent used may be starch, a saccharide, alcohol or other organic compound, or hydrazine, hydrophosphorus acid or another inorganic compound.

Suitable resins which may be used according to the invention include water-soluble organic polymer compounds, specifically carboxyl-containing anionic polyacrylic acid and polymethacrylic acid and their copolymer compounds, maleic acid copolymer compounds, vinyl acetate copolymer compounds, vinyl carboxylate ester, vinyl ether, styrene, acrylamide, acrylonitrile, vinyl halides and other ethylenic unsaturated compounds, polyethylene compounds, polyurethane compounds, epoxy resin compounds, polyester compounds, etc. These organic polymer compounds are mainly added alone when used, but two or more types may also be added in combination. Among them, emulsion-type resins are particularly preferred when conventional chromate equipment is used because they are suitable for low temperature baking. Also, addition of a small amount of a lubricant or antirust pigment to the resin is not contrary to the gist of the invention.

According to the invention, the composite chromate treatment is carried out by a step following plating. The treatment is primarily for the purpose of weldability, but since resin chromates have lubricity, they also have the advantage of improved workability. While this is the reason for limitation to a composite chromate, the composite chromate may also contain added silica for the purpose of improving corrosion resistance and phosphoric acid for the purpose of reducing the yellowness of the chromate.

The thickness of the composite chromate film is restricted to 0.1–2 μm. At less than 0.1 μm it is impossible to form a film which is sound in terms of the resin, and with a film of greater than 2.0 μm the resistance value is too high, impeding electric conduction between the electrode and the steel sheet or between steel sheet and steel sheet, thus making welding itself impossible. The composite chromate treatment may involve coating on either or both sides, but the ideal film thickness is slightly different depending on whether it is on one or both sides. Since the heat release during welding generally depends on the contact resistance between the adjacent steel sheets, composite chromate treatment of over 1.0 μm on both sides will produce a resin chromate film of over 2.0 μm between the steel sheets, thereby impeding electric conduction between the steel sheets. When coating both sides, therefore, it is preferred for each film to be 1.0 μm or less, and in the case of one sided coating, it is preferred for the resin sides to be designated as inside and outside when combined.

For improved uniform coatability of the treatment solution and improved corrosion resistance and coating performance of the chromate film, the chromate treatment solution of the invention may also contain a phosphoric acid compound and/or colloidal silica comprising either or both silica and a silicate. The phosphoric acid compound is added in a range of 100 parts by weight to 600 parts by weight to 100 parts by weight of Cr in the chromic acid. At less than 100 parts by weight the effect of its addition will be insufficient, and at greater than 600 parts by weight the chromate film will tend to absorb water, thus impairing the corrosion resistance. The colloidal silica comprising either or both silica and a silicate is in the range of 100 parts by weight to 1000 parts by weight to 100 parts by weight of Cr in the chromic acid. At less than 100 parts by weight the uniform coatability will be impaired, making it difficult to ensure corrosion resistance and coating performance, while at greater than 1000 parts by weight the effect will be saturated.

In order to form a chromate film with more excellent corrosion resistance and coating adhesion, phosphonic acid or a phosphonic acid salt compound may also be added to the inorganic and organic composite chromate film of the invention. The phosphonic acid is preferably added at 10 parts by weight to 200 parts by weight to 100 parts by weight of Cr in the chromic acid. If the phosphonic acid is added at less than 10 parts by weight, there will be a reduced surface cleansing effect by etching of the phosphonic acid and reduced anticorrosion and coating adhesion effects by uniform formation of the film and by its inclusion in the film. The phosphonic acid is preferably not added at greater than 200 parts by weight because the effect of its addition will be saturated and the stability of the treatment bath will be lower.

When the composite chromate film is applied on only one side, more satisfactory corrosion resistance can be ensured by forming on the other side a chromate film containing silica, preferably. The chromate film may be formed by a conventional publicly known method, with a amount of coating of from 10 $mg/m^2$ to 200 $mg/m^2$. At less than 10 $mg/m^2$ satisfactory corrosion resistance cannot be sufficiently obtained for fuel tanks, and at greater than 200 $mg/m^2$ the effect will be saturated.

According to the invention the chromate treatment is carried out in a step following the plating, and the manufacturing process may be application, immersion, spraying or any other publicly known process.

According to one preferred mode of the invention for carrying out the first embodiment which employs an organic and inorganic composite chromate film, not only the resistance weldability and corrosion resistance but also the continuous press formability can be improved by adding a prescribed amount of a lubricant to the composite chromate film. Also, since it is possible to accomplish the treatment with one less step compared to resin coating treatment after inorganic chromate treatment, which is the standard organic coating treatment, it is therefore a superior treatment in economic terms. In addition, by using a low temperature curable resin, there is a further advantage in that no special dry furnace is necessary and treatment is possible with conventional chromate treatment equipment.

Specifically, a composite chromate film to which a lubricant is added at 0.5–20 wt % is formed to a thickness of 0.1–2 μm on the aluminizing layer(s) of one or both sides of the aluminized steel sheet. Instead of forming the composite chromate film on both sides of the plated steel sheet, an organic and inorganic composite chromate film may be formed on one side and an inorganic-based chromate film, organic film or an organic film on an inorganic-based chromate film may be formed on the other side.

The lubricant added for improved press formability is preferably one which disperses and dissolves easily in water, since the resin is an aqueous system. Such lubricants include ester-based, brazing material-based, stearic acid-based, silicon-based special olefin-based and paraffin brazing material-based lubricants. Based on the experience of the present inventors all such lubricants exhibit their corresponding effects, but stearic acid-based lubricants have been most effective.

FIG. 3 is a graph showing the changes in Bowden friction coefficients of films containing different amounts of stearic acid-based lubricants (measuring conditions: 10 mm diameter steel ball, 500 g load, average value n=5) and the blackened state of tape applied to the external sides of samples after cylindrical drawing with a diameter of 70 mm and a depth of 40 mm (see examples for evaluation scale, etc.). An effect was found from a content of 0.5 wt %, and workability improved as the lubricant content increased. At over 20 wt %, however, the effect tended to become saturated, while dispersion and dissolution in the composite chromate solution was hindered so that gelation of the solution occurred. Hence, the lubricant is added at 0.5–20 wt %, and preferably 0.5–15 wt %.

Treatment on the other side of the single-side composite chromate-treated material may be appropriately selected (the other side may be left untreated) depending on the need. That is, the inorganic chromate film may be formed at sections which do not require strict formability, such as on separator and subtank members used inside the tank. Sections which require lubrication and weldability, such as the exterior of the tank, may be subjected to organic film treatment or organic film treatment on inorganic chromate. Since the tank exterior is given a thick coating in the final step, less corrosion resistance is required for the thin-film on the plating. However, it does require coating adhesion, and organic film treatment on inorganic chromate will be more stable than a simple organic film layer. The "inorganic chromate" referred to here may be a coating type, reaction type or electrolytic type. The aforementioned lubricant may also be added to the organic film.

Another preferred mode of the invention, however, is to form the organic and inorganic composite chromate film on one side of a steel sheet which is aluminized on both sides, and to form an inorganic-based chromate film C on the other side to 200 mg/m$^2$ or less in terms of Cr, or form an inorganic-based chromate film C to 100 mg/m$^2$ or less in terms of Cr between the composite chromate film and the aluminizing layer. This inorganic-based chromate film C preferably contains a small amount (less than 50 wt %) of either or both an organic phosphoric acid and phosphonic acid or a phosphonic acid salt compound.

As a result of much research intended to improve the resistance weldability of aluminized steel sheets, the present inventors have found that the weldability can be vastly improved by coating the surface of an aluminized steel sheet with an oxide film, chromate film, organic resin film or the like. It was found that this effect increases the contact resistance between steel sheets due to the film, thus accelerating formation of welding nuggets by providing adequate heat between the steel sheets even under a low welding current, while also suppressing reaction between the welding electrode chips and plating metal because of the film, so that the life of the electrode can be extended.

Materials wherein an organic resin film is coated on both sides of the aluminized steel sheet have both sides coated with an organic resin, and therefore the treatment cost is greater than by conventional inorganic-based chromate treatment, and corresponding treatment equipment (roll coater, electrostatic coating apparatus, etc.) must be provided for both sides. It also requires a dry furnace which allows curing under relatively high temperatures.

This mode of the invention was developed with the goal of achieving suitable treatment cost and weldability. That is, a composite chromate film comprising a resin and a chromic acid compound is formed to an appropriate thickness on one side of the steel sheet, while on the other side there is formed an inorganic-based chromate film comprising a chromic acid compound and silica or an inorganic-based chromate film containing either or both an organic phosphoric acid and a small amount of a resin, or optionally an inorganic chromate film or an inorganic-based chromate film containing either or both an organic phosphoric acid and a small amount of a resin is formed between the composite chromate film and the plating layer. Development of this treatment was completed after it was found to exhibit corrosion resistance and other effects at a relatively lower cost than spot welding, seam welding and other types of common resistance welding.

The composite chromate film exhibits sufficient corrosion resistance under normal conditions, but for even greater corrosion resistance, inorganic-based chromate treatment may be carried out at the interface between the composite chromate film and the plating layer. For example, in cases where deep working defects have been generated in the aluminizing layer, since elution of chromic acid in the film is inhibited by the resin, less rustproofness is often exhibited as compared to inorganic-based chromates, and depending on the environment rust may tend to be generated from defect locations. It was found that by accomplishing this treatment it is possible to further improve the anticorrosion performance in addition to giving the satisfactory resistance weldability described above.

In this case, the amount of coating of the inorganic-based chromate film should be 100 mg/m$^2$ or less in terms of metallic chromium. At greater than 100 mg/m$^2$ the effect of corrosion resistance will be saturated, while the thickness of the film including that of the composite chromate film will increase, thus raising the contact resistance value and adversely affecting the weldability.

While the composition of the inorganic-based chromate film is not particularly restricted, it may be a chromic acid compound/silica mixture solution, and one or more from among phosphoric acid, organic phosphoric acids such as phosphonic acid or phosphonic acid salt compounds and resins may also be added. However, if the organic phosphoric acid or resin is added in too great an amount the cost burden will increase, and the effect (corrosion resistance improvement, etc.) will become saturated. The concentration ratio of the organic phosphoric acid/chromic acid compound may be $\leqq 1$, and the concentration ratio of the resin/chromic acid compound may be $\leqq 1$.

(Second embodiment)

According to a second embodiment of the coating aluminized steel sheet of the invention, an inorganic-based chromate film A is formed on the aluminizing layer on one or both sides of the aluminized steel sheet, and specifically an inorganic-based chromate film is formed which comprises 100 parts by weight of the chromic acid compound in terms of metallic chromium and 100–1000 parts by weight of colloidal silica, and further comprises at least one selected from among 100–600 parts by weight of a phosphoric acid compound, 10–200 parts by weight of a phosphonic acid or phosphonic acid salt compound and less than 50 parts by weight of an organic resin.

The inorganic-based chromate is a type whose main components are a chromic acid compound and colloidal silica and which contains phosphoric acid, a phosphonic acid or phosphonic acid salt compound or a small amount of a resin, and it can be employed sufficiently in practical use despite its slightly poorer weldability than materials having both sides composite chromate-treated, because the treatment can be accomplished at lower cost compared to resin applications and composite chromates; they also provide some degree of corrosion resistance, and there is an effect which increases the contact resistance value between steel sheets and inhibits reaction between the welding electrode and plating metal.

For the inorganic-based chromate film A according to this embodiment, the chromium or chromic acid compound, phosphoric acid compound, colloidal silica, phosphonic acid or phosphonic acid salt compound and resin are the same as used for the first embodiment.

The chromate treatment solution for this embodiment may also contain a phosphoric acid compound and/or colloidal silica comprising either or both silica and a silicate, for more uniform application of the treatment solution and improved corrosion resistance and coating performance for the chromate film. The phosphoric acid compound is added in the range of 100 parts by weight to 600 parts by weight to 100 parts by weight of Cr in the chromic acid. At less than 100 parts by weight the effect of addition will be insufficient, and at greater than 600 parts by weight the chromate film will tend to absorb water, thus impairing the corrosion resistance. The colloidal silica comprising either or both silica and a silicate is added in the range of 100 parts by weight to 1000 parts by weight to 100 parts by weight of Cr in the chromic acid. At less than 100 parts by weight the uniform coatability will be impaired, making it difficult to ensure corrosion resistance and coating performance, while at greater than 1000 parts by weight the effect will be saturated.

In order to form a chromate film with more excellent corrosion resistance and coating adhesion, phosphonic acid or a phosphonic acid salt compound may also be added to the inorganic-based chromate film of the invention. The phosphonic acid is preferably added at 10 parts by weight to 200 parts by weight to 100 parts by weight of Cr in the chromic acid. If the phosphonic acid is added at less than 10 parts by weight, there will be a reduced surface cleansing effect by etching of the phosphonic acid and reduced anti-corrosion and coating adhesion effects by uniform formation of the film and by its inclusion in the film. The phosphonic acid is preferably not added at greater than 200 parts by weight because the effect of its addition will be saturated and the stability of the treatment bath will be lower.

The thickness of the inorganic-based chromate treatment film A is 200 mg/m$^2$ or less in terms of metallic chromium. Satisfactory resistance weldability can be achieved within this range, but more satisfactory resistance weldability is achieved between 75 mg/m$^2$ and 120 mg/m$^2$. If the amount of coating exceeds 200 mg/m$^2$, the insulating property will increase, thus impairing the weldability. Conversely, if it is too low the effect of inhibiting reaction between the electrode and plating will be unstable, and the weldability will tend to be poorer. A chromium amount of coating of 10–200 mg/m$^2$ is preferred.

(Third embodiment)

According to a third embodiment of the coating aluminized steel sheet of the invention, an inorganic-based chromate film B is formed on the aluminizing layer on one or both sides of the aluminized steel sheet.

Here, the inorganic-based chromate film B is an inorganic-based film composed mainly of a conventional known chromium (chromic anhydride), and if necessary including admixture of silica or other additives.

As a result of much research on aluminized steel sheets with excellent corrosion resistance, formability and weldability, the present inventors have achieved development of a steel sheet with excellent properties for fuel tanks by treatment of the surface with a suitable amount of an inorganic-based chromate.

As a result of further research on properties required for fuel tanks and the details involved in their manufacture, the present inventors found that it is advantageous to form the inorganic-based chromate film on the surface of the Al-based plating layer to at least 10 mg/m$^2$ and less than 35 mg/m$^2$, and for use as a fuel tank material, preferably at least 20 mg/m$^2$ and less than 30 mg/m$^2$. From the standpoint of corrosion resistance, at less than 10 mg/m$^2$ the effect is insufficient and there are concerns of corrosion from plating layer cracks at worked sections. The plating metal also tends to adhere to the electrode during spot welding, thus hindering continuous operation. An amount of coating of 10 mg/m$^2$ or greater gives sufficient corrosion resistance and resistance weldability for fuel tanks, but at 20 mg/m$^2$ or greater the resistance weldability is even more satisfactory. If the amount of coating is 35 mg/m$^2$ or greater, however, the corrosion resistance is satisfactory but problems result in terms of weldability, such as reduced brazing material wettability with certain brazing material materials.

With these considerations, therefore, a lower Cr amount of coating is preferred for brazing properties, and the present inventors established an upper limit of less than 35 mg/m$^2$, and preferably no greater than 30 mg/m$^2$ for fuel tanks.

According to the invention, the inorganic-based chromate treatment is carried out in a step following plating, but there are no particular restrictions on the composition of the inorganic-based chromate treatment solution. The composition of the inorganic-based chromate film may be that of an inorganic-based chromate treatment solution with a publicly known composition, and the production process may be any publicly known process, such as immersion, spraying, electrolysis, application or the like.

For this embodiment, the aluminizing layer is suitably Al or an Al alloy with 3–15% Si.

Automobile Fuel Tank

According to the invention there is provided a fuel tank, especially an automobile fuel tank, produced using the aforementioned coating aluminized steel sheet. The fuel tank contains no Pb in light of environmental considerations and has the above-mentioned excellent properties of corrosion resistance, press formability and weldability, and it is particularly useful as an automobile fuel tank, such as an automobile gasoline tank, alcohol fuel tank, etc.

According to one aspect of the invention, it is an automobile fuel tank wherein a pair of bowl-shaped bodies with flanges are integrated by continuous seam-welding of the flange substances, the automobile fuel tank being characterized in that the materials of which the bowl-shaped bodies are made are coating aluminized steel sheets which consist of aluminized steel sheets each having on one or both sides an aluminizing layer based on aluminum or an aluminum alloy containing 2–13 wt % silicon, and having a resin coating on the uppermost surface of the inner and/or outer side.

Specifically, it was found that working of steel sheets produces cracks in the aluminizing layer because of the poor lubricity of the aluminized plating surface, and in order to prevent this the aluminizing surface was provided with a satisfactorily lubricous resin film which vastly improved the corrosion resistance after working.

The automobile fuel tank is formed by forming upper and lower tank members into bowl shapes with flanges by pressing or the like, and combining the upper and lower members and seam welding the flange sections. This structure is not particularly limited, but it is preferably equipped with a fuel supply opening, a fuel supply pump, a fuel hose, a fuel hose which returns excess fuel, separators to prevent the sound of fuel waves, etc., as in a normal fuel tank.

Figure 4:
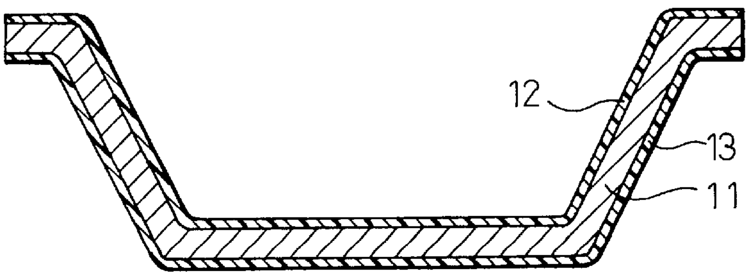
FIG. 4 is a vertical cross-sectional view of the lower part of an automobile fuel tank.

FIG. 4 is a cross-sectional illustration of the lower part of an automobile fuel tank. This tank is an example wherein resin films 12, 13 are formed on the uppermost surfaces of both sides of an aluminized steel sheet 11. The resin film 12 can provide a lubricating function, especially on the inside, when forming is accomplished by deep drawing while press forming.

The method for bonding the members may be spot welding, soldering or brazing. The difference between soldering and brazing is not clearly defined, but in this specification brazing will be considered welding with a metal having a melting point of 450° C. or higher, and soldering the use of a metal with a melting point below that temperature. The major feature of this fuel tank is the material of which the fuel tank is composed, i.e. not only the tank body but also the internal separators, supply openings, etc. are made of materials containing substantially no Pb. The conventional fuel tank body containing Pb is replaced with an aluminized steel sheet having a resin film on the uppermost surface. The soldering and brazing materials may also be aluminum-based materials containing substantially no Pb.

With conventional naked aluminized steel sheets there has been a concern of drastic reduction in corrosion resistance by working, but according to the invention this is solved with a resin film on the uppermost surface layer. This is connected with the fact that naked aluminized steel sheets have poor lubricity even when oiled, and cracks are produced in the platings, drastically impairing the corrosion resistance; however, formation of a highly lubricous resin film on the surface succeeded in suppressing cracks in the plating. If the film thickness is too low the film will not cover the entire surface, and the effect of improved corrosion resistance after press forming will be lessened. A higher film thickness is advantageous for corrosion resistance after press forming, but if it is too high the welding, soldering or brazing becomes more difficult, thus hindering the production efficiency of the fuel tanks.

The thickness of the resin film according to this aspect of the invention is preferably 0.1–2 μm after forming. It is more preferably 0.3–1 μm. The resin film provides its effect whether it is formed on both sides, on the outer side alone or on the inner side alone. While the effect can be easily imagined if the film is on the inner side, it is believed that there is an effect even on the outer side alone, for the following reason. Common press forming is used for forming of the fuel tank, and the surface lubricity is a major factor contributing to the press formability. The lubricity of the outer side is a particularly important factor here, and therefore even if the film is only on the outer side it is thought to have an effect on the inner side as well in the sense of preventing damage to the plating.

The material for brazing or soldering of the fuel tank may also be, for example, aluminum-based. Soldering or brazing of an aluminum surface is usually considered to be difficult because of the stable passive film on the aluminum surface, but highly productive joints can be achieved by using appropriate flax. An aluminum-based brazing material has a higher melting point than conventional Pb—Sn-based solder, and therefore satisfactory brazing can be accomplished even with a resin film. Ni-based materials can also be used.

The fuel tank surface has a resin film, but no particular restrictions are placed on the composition and structure of the resin film. Examples of suitable systems which may be used for the resin include water-soluble organic polymer compounds, specifically carboxyl-containing anionic polyacrylic acid and polymethacrylic acid and their copolymer compounds, maleic acid copolymer compounds, vinyl acetate copolymer compounds, vinyl carboxylate ester, vinyl ether, styrene, acrylamide, acrylonitrile, vinyl halides and other ethylenic unsaturated compounds, polyethylene compounds, polyurethane compounds, epoxy resin compounds, polyester compounds, etc. These organic polymer compounds are mainly added alone when used, but two or more types may also be added in combination. However, the resin film used is particularly preferred to be a resin/inorganic composite chromate film. The composite chromate is prepared by mixing chromic acid with the resin in a chromate treatment solution, for even dispersion of the chromic acid compound in the resulting film. The $Cr^{6+}$ contained therein elutes during use of the tank, to give stabilized corrosion resistance. It is especially preferred to use a coating aluminized steel sheet according to the invention having one of the types of chromate films described above (organic and inorganic composite chromate film, inorganic-based chromate film A, inorganic-based chromate film B).

This treatment is also more advantageous in terms of cost as compared to standard resin film treatment involving resin coating after chromate treatment, since the treatment can be accomplished in a single step. In addition, by using a low-temperature curable resin, there is a further advantage in that no special dry furnace is necessary and treatment is possible with conventional chromate treatment equipment. When conventional chromate equipment is used, the type of resin used is preferably an emulsion type which can be baked at low temperatures. Furthermore, addition of a small amount of a lubricant, antirust pigment or the like to the resin can also enhance the effect.

Welding Process for Fuel Tank

As a result of much research on surface treatment and welding processes for aluminized steel sheets with excellent resistance weldability and continuous operation suitability, the present inventors have found that the problems of welding described above can be solved and vast improvement in continuous operation can be achieved by forming a resin coating layer or a chromate-containing resin coating layer on one or both sides of aluminum-based plated steel sheets, and welding the steel sheets by an appropriate method of combination.

Specifically, two resin-coated aluminum-based plated steel sheets, each of which has a plating layer comprising aluminum and unavoidable impurities or comprising 2–13 wt % Si and the remainder aluminum and unavoidable impurities formed on one or both sides, as well as a resin coating layer provided on the one or both sides, are combined and seam welded between a pair of electrode wheels, wherein at least the sides corresponding to the inner side of the fuel tank have an aluminum-based plating layer, and a resin coating layer is provided on at least one of the steel sheet surfaces at the side where the steel sheets meet and/or on at least one of the steel sheet surfaces at the side where it contacts with the electrode wheel.

As explained above, the steel sheet-coating aluminum reacts readily with the electrode Cu, resulting in the problem of more rapid electrode loss and poorer continuous operation. Accordingly, there are two important objects for improved continuous operation: minimizing the electrode loss and increasing the contact resistance value between the steel sheets in order to form more efficient nuggets. The present inventors have discovered that for this purpose, formation of a resin coating layer on one or both sides of each aluminized steel sheet and welding of the steel sheets by a suitable method for combination can effectively ensure satisfactory resistance weldability and improve continuous operation, and the present invention has thus been completed.

Figure 5A:
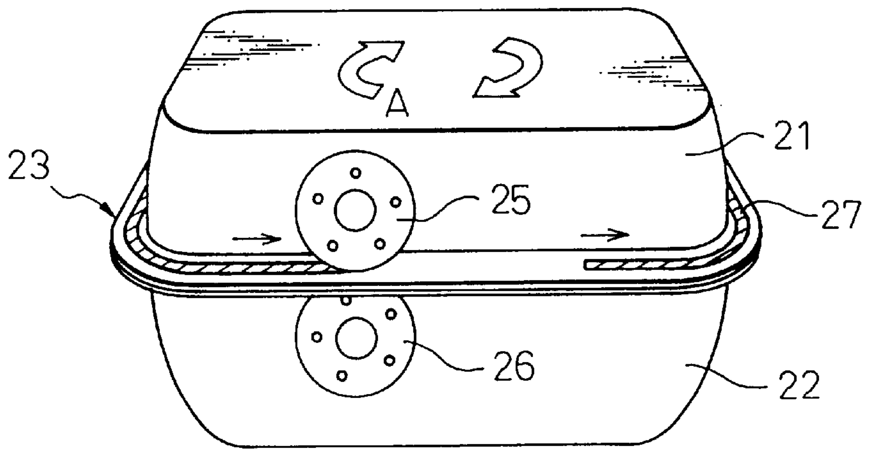
FIGS. 5A–5C are illustrations of seam welding of automobile fuel tanks.
Figure 5B:
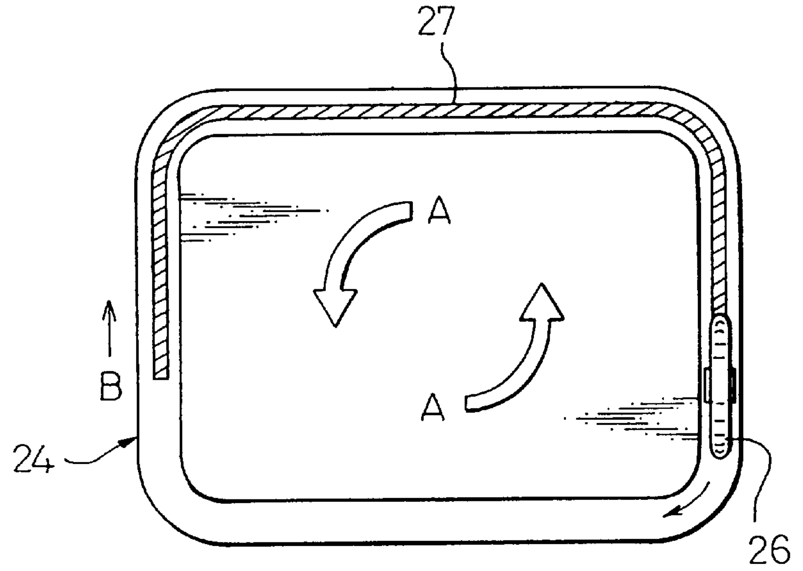
Figure 5C:
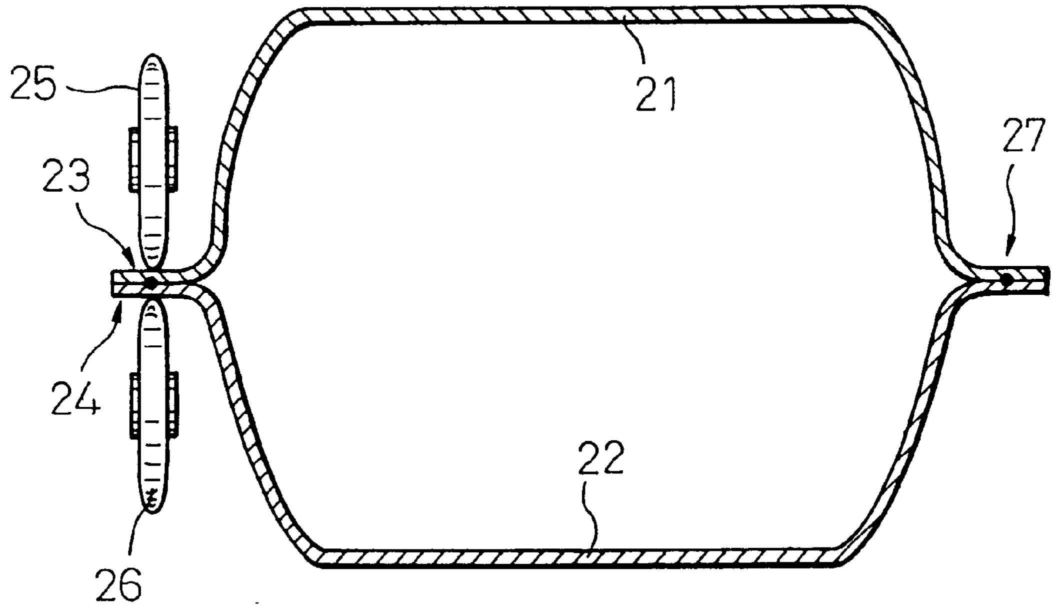

FIGS. 5A–5C are illustrations of seam welding of automobile fuel tanks. FIG. 5A is a perspective view, FIG. 5B is a lower view of FIG. 5A, and FIG. 5C is a cross-sectional view. In these illustrations, the upper and lower tank members 21, 22 formed by deep drawing of steel sheets are contacted together toward the inside of the tank at the flange sections 23, 24 with the exterior sides of the tank sandwiched between electrode wheels 25, 26 for seam welding, and a current flows between the electrode wheels 25, 26 to weld the flange sections (seam welding section 27) while the fuel tank is rotated (in direction A) so that the entire flange section perimeter is welded (direction B).

In this type of seam welding, the presence of the resin film side between the steel sheets has increased the contact resistance value between the steel sheets, as shown in FIG. 6A. Consequently, by situating the resin coating side between the steel sheets the improved contact resistance value between the steel sheets can provide satisfactory nugget formation due to accelerated heating. In addition, when a resin film side is present between the steel sheet and electrode, the resistance value is virtually the same as with an untreated material even though one layer of film is present between them. Thus, situating a resin coating side between the steel sheet and electrode can provide an effect of lower electrode loss due to the protecting action of the film. This is attributed to the fact that a more uniform thin layer is possible during pressurization since the resin is soft and forms a tough film, so that uniform weld current passing points are produced. This function provides an effect whether the resin film is present on at least one of the steel sheet surfaces between the combined steel sheets, or whether the resin film is present on the side of the steel sheet contacting the electrode wheel. The effects are cumulative when the treatment is on both sides, so that the overall effect is greater.

Figure 6B:
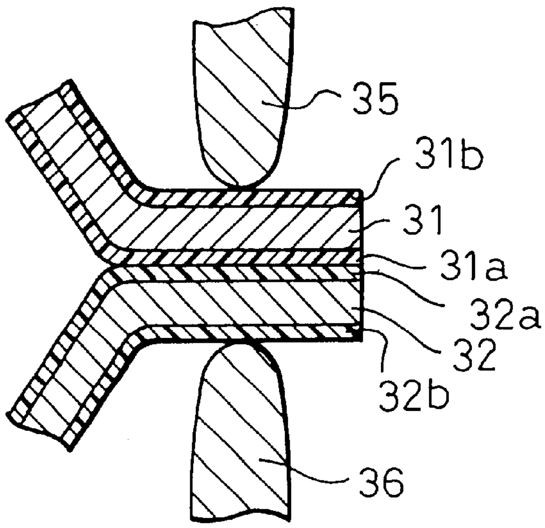
FIG. 6A is a bar graph showing the contact resistance values for the resin coated materials and untreated materials shown in FIGS. 6B–6D.
Figure 6C:
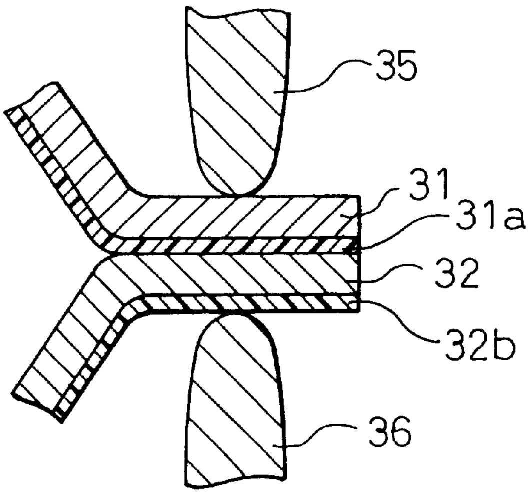
Figure 6D:
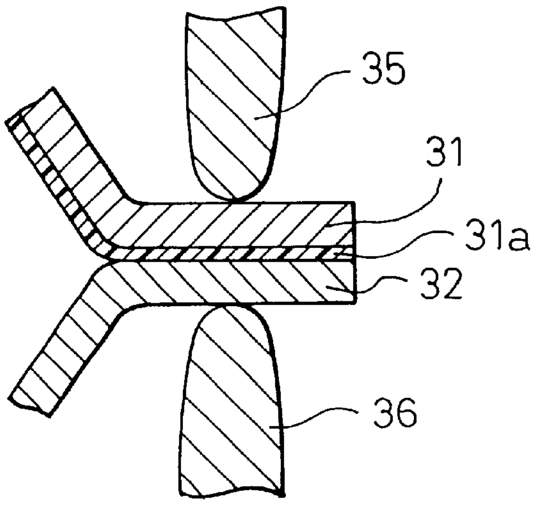

FIG. 6A is a bar graph showing the contact resistance values between upper electrode and sheet, the contact resistance values between sheet and sheet and the contact resistance values between sheet and lower electrode for the different sample steel sheets described below and illustrated in FIGS. 6B–6D. In FIGS. 6B–6D, 31 and 32 are flange sections of aluminized steel sheets, 31*a* and 32*a* are resin films on the sides between steel sheets (inner sides), and 31*b* and 32*b* are resin films on the sides of the electrode wheels 35, 36 (outer sides).

Resin coating material ①: Combination of both-side resin coated materials (1 μm epoxy resin)

Resin coating material ②: Combination of one-side coated material (1 μm epoxy resin, steel sheet side) and one-side coated material (1 μm epoxy resin, electrode side)

Resin coating material ③: Combination of one-side coated material (1 μm epoxy resin, steel sheet side) and untreated material The resin coating amount which expresses the effect described above is at a thickness of 0.1–2 μm. At less than 0.1 μm its contribution to resistance weldability is insufficient, and at greater than 2 μm the total thickness between steel sheets when both sides are treated is over 4 μm, resulting in an excessively large contact resistance value and poor continuity.

The resin used for the invention may be either water-soluble or a solvent system. Examples include water-soluble organic polymer compounds, specifically carboxyl-containing anionic polyacrylic acid and polymethacrylic acid and their copolymer compounds, maleic acid copolymer compounds, vinyl acetate copolymer compounds, vinyl carboxylate ester, vinyl ether, styrene, acrylamide, acrylonitrile, vinyl halides and other ethylenic unsaturated compounds, polyethylene compounds, polyurethane compounds, epoxy resin compounds, polyester compounds, etc. These organic polymer compounds are mainly added alone when used, but two or more types may also be added in combination.

Also, while an adequate effect is exhibited with a resin film alone, satisfactory resistance weldability can also be obtained with satisfactory corrosion resistance by application of a treatment solution in combination with a chromate treatment solution composed mainly of chromic acid, to form an organic and inorganic composite chromate film or the above-mentioned inorganic-based chromate film A (resin-added), especially when the resin system is water-soluble.

The resin/chromate combination treatment solution may also contain silica or phosphoric acid for enhanced corrosion resistance, coating adhesion and uniform coatability.

According to the invention, the resin coating layer is formed in a step following plating, and the production process may be any publicly known process, such as application, immersion, spraying or the like.

The aluminum plating with formation of a resin coating layer may be and is preferred to be as described above.

EXAMPLES

In the examples which follow, the following performance evaluation methods were employed.

(1) Press formability evaluation

① Cylindrical drawing test A

A forming test was carried out with a hydraulic forming tester using a 50-mm diameter cylindrical punch at a draft of 2.3. The blank holding pressure was 500 kg, and the formability was evaluated according to the following scale.

◎: Formable, no plating layer defects

○: Formable, slight damage to plating layer

Δ: Formable, peeling of plating layer x: Unformable

② Cylindrical drawing test B

A forming test was carried out with a hydraulic forming tester using a 70-mm diameter cylindrical punch at a draft of 2.3. The blank holding pressure was 1000 kg, and the formability was evaluated based on outer appearance of the shaped cylinder and visual judgment of blackening of applied tape.

(Evaluation scale)

◎: Formable, no plating layer defects, no blackening of tape

○: Formable, no plating layer defects but slight blackening of tape

Δ: Formable, some flaws in plating layer, blackening of tape x: Unformable, peeling of plating layer ③ Bowden friction coefficient measurement Measured by the Bowden method using a 10 mmϕ stainless steel sphere with a load of 500 g. The measurement included scanning 10 times at the same location, and the average value was determined.

(Evaluation scale)

◎: Friction coefficient ≦0.1

○: 0.1< friction coefficient ≦0.25

Δ: 0.25< friction coefficient ≦0.4 x: 0.4< friction coefficient (2) Weldability evaluation

① Spot welding

Spot welding was carried out under the welding conditions described below, and the number of continuous weld points to the time at which the nugget diameter cleared $4\sqrt{t}$ (t=sheet thickness) was evaluated. For one-sided coatings, the evaluation was made with the resin side on the inside and outside when the sheets were combined.

(Welding conditions)

Welding current: 10 kA, pressure force: 220 kg, welding time: 12 cycles, electrode tip diameter: 6 mmϕ, electrode shape: dome (Evaluation scale)

◎ex (excellent): 1500 or more continuous weld points

◎ (very good): 1000-less than 1500 continuous weld points

○ (good): 500-less than 1000 continuous weld points

Δ (fair): 250-less than 500 continuous weld points x (not good): less than 250 continuous weld points ② Seam weldability evaluation An R6 mm-ϕ250 m electrode wheel was used for 10 m of seam welding at a welding current of 13 kA, a pressure force of 400 kg and an electrization of 2 on-2 off, after which a test sample was prepared according to JIS-Z-3141 and subjected to a leaking test. Evaluation A was made on the following scale.

○: No leaking x: Leaking

Simultaneously with the leaking test, the cross-section weld penetration and contamination of the electrode surface were observed for evaluation B on the following scale.

◎: No leaking (satisfactory weld penetration, virtually no contamination of electrode surface)

○: No leaking (satisfactory weld penetration, little contamination of electrode surface)

Δ: No leaking (satisfactory weld penetration, much contamination of electrode surface)

x: Leaking (abundant opened holes or poor weld penetration, much contamination of electrode surface)

③ Brazing evaluation

The brazing material spread was evaluated according to JIS Z-3191. A flat sample was toluene-degreased and then flax was coated onto the sheet, a fixed amount of brazing material was applied, the sample was heated at a prescribed temperature for a given time in an heating furnace, and the area of brazing material spread was measured.

(Test conditions)

Brazing material: Al-10% Si brazing material (100 mg), flax: chloride/fluoride system (AWS Nol), heating temperature: 590° C., heating time: 30 sec.

(Evaluation)

◎: Satisfactory spreading

○: Satisfactory spreading but slight edge sinking

Δ: Some spreading with edge sinking and caving x: Almost no spreading (3) Corrosion resistance evaluation ① Plated steel sheet test The corrosion resistance against gasoline was evaluated. In the method employed, a test fluid was placed in a sample with a 20 mm flange, 50 mm diameter and 25 mm depth which had been worked by flat-bottom cylindrical drawing with a hydraulic forming tester, and the sample was covered with glass via a silicon rubber ring. The condition of corrosion after the test was visually observed. Those materials treated on only one side were tested on their treated side.

(Test conditions)

Test fluid: gasoline+10% distilled water+200 ppm formic acid

Test period: 3 months at 40° C.

(Evaluation scale)

◎: No change

○: White rust of 0.1% or less

Δ: Red rust of 5% or less, or white rust of 0.1%–50% x: Red rust of over 5% and considerable white rust

② Fuel tank test

The corrosion resistance against gasoline was valuated. In the method employed, a shaped fuel tank was kept at constant temperature while a test fluid was continuously circulated therein. After the test, the condition of corrosion of the cut fuel tank was visually observed.

(Test conditions)

Test fluid: gasoline+10% distilled water+200 ppm formic acid

Test period: 3 months at 40° C.

(Evaluation scale)

○: Red rust of less than 0.1%

Δ: Red rust of 0.1–5%, or white rust present x: Red rust of over 5% and considerable white rust ③ Pb elution After the above test (3), the amount of Pb eluted into the test fluid was quantified by a wet method and used to evaluate the Pb elution.

(Evaluation scale)

○: No elution (below detection level)

x: Elution

④ Flaw corrosion

A cross-cut flaw was made in a 70 mm×150 mm piece, and the rust generation was determined by a salt spray test. Both the resin chromate treated side and inorganic-based chromate side were evaluated.

(Test conditions)

Salt spray test: Rate of rust generation after 240 hours (Evaluation scale)

(○ex: no rust generation)

○: less than 5% white rust

Δ: 5–50% white rust or less than 5% red rust x: over 50% white rust or considerable red rust

Examples 1–28

Steels having the components listed in Table 1 were prepared as ingots by conversion/vacuum degassing processing, and steel samples were subjected to hot rolling and cold rolling under normal conditions to obtain cold-rolled steel sheets (thickness: 0.8 mm).

TABLE 1

| | Plating sheet components (wt %) | | | | | | | | |
|---|---|---|---|---|---|---|---|---|---|
| Sample | C | Si | Mn | P | S | Ti | Al | B | N |
| A | 0.0012 | 0.03 | 0.32 | 0.007 | 0.009 | 0.054 | 0.04 | 0.0003 | 0.0033 |
| B | 0.0020 | 0.09 | 0.32 | 0.008 | 0.011 | 0.040 | 0.04 | — | 0.0032 |

These materials were used for hot dip aluminizing. The hot dip aluminizing was accomplished using a non-oxidizing furnace/reducing furnace type line, and annealing was also carried out in this fused plating line. The annealing temperature was 800–850° C. After plating, the amount of plating was adjusted by the gas wiping method. Here, the plating temperature was 660° C., the plating bath composition was basically Al-2% Fe, and Si was also added. The Fe in the bath was supplied from plating equipment and strips in the bath.

Aluminized steel sheets produced in this manner were subjected to composite chromate treatment with the bath of Table 2 as the standard composition. Baths with the same (resin amount+chromic acid amount) in Table 2 but with different resins/chromic acid were also used. The film thickness was adjusted with a linger roll, and hot air at 80° C. was used for drying to complete the film.

TABLE 2

| Standard composition of composite chromate treatment solution (g/l: in terms of pure composition) | |
|---|---|
| | Concentration |
| Resin | 120 |
| Chromic acid | 30 |
| Phosphoric acid | 60 |
| Colloidal silica | 10 |

The performance of steel sheets produced in this manner as fuel tanks was evaluated. The evaluation method used here was the following, and the plating conditions and performance evaluation results are shown in Tables 3 and 4.

Press formability: Cylindrical drawing test A

Weldability: Spot weldability evaluation

Corrosion resistance: Plated steel sheet test

As shown in Table 4, when the Si content of the plating is too low (Comparative Example 23) the alloy layer grows too much, resulting in peeling of the plating during working. Conversely, when the Si content is too high (Comparative Example 24), the corrosion resistance is impaired. When the amount of aluminizing layer is too great (Comparative Example 25) the welding section is inferior. When the film thickness is too small (Comparative Example 26) or too large (Comparative Examples 27, 28), satisfactory weldability cannot be obtained. By manufacturing the platings with the satisfactory plating composition, the amount of plating and composite chromate conditions, hot dip aluminized steel sheets with excellent press formability, weldability, outer appearance and corrosion resistance can be obtained. However, when the resin/chromium ratio is low or high (Examples 19, 22) the weldability is slightly impaired, and therefore the resin/chromium ratio is preferred to be a proper value.

Examples 1–23 provide hot dip aluminized steel sheets which have both the corrosion resistance and press formability required for automobile fuel tank materials, as well as achieving the weldability which has been a problem in the past, and they are therefore very promising as new fuel tank materials and represent a major contribution to industry, as a solution to future difficulties involved with using Pb-based materials which have become an environmental problem.

TABLE 3

| | Ex. no. | Sheet | Si content in bath (wt %) | Amount of plating of one side ($g/m^2$) | Composite chromate film thickness ($\mu m$) (one or each of both sides) | Major resin of composite chromater film | Resin/chromium ratio |
|---|---|---|---|---|---|---|---|
| Invention Exs. | 1 | A | 9.4 | 30 | both: 0.4 | acryl. acid ester | 8.0 |
| | 2 | B | 9.4 | 30 | both: 0.4 | acryl. acid ester | 8.0 |
| | 3 | A | 5.2 | 30 | both: 0.4 | acryl. acid ester | 8.0 |
| | 4 | A | 11.4 | 30 | both: 0.4 | acryl. acid ester | 8.0 |
| | 5 | A | 9.4 | 30 | both: 0.4 | acryl. acid ester | 8.0 |
| | 6 | A | 9.4 | 30 | both: 0.2 | acryl. acid ester | 8.0 |
| | 7 | A | 9.4 | 30 | both: 0.8 | acryl. acid ester | 8.0 |
| | 8 | A | 9.4 | 30 | both: 1.2 | acryl. acid ester | 8.0 |
| | 9 | A | 9.4 | 30 | one: 0.2 | acryl. acid ester | 8.0 |
| | 10 | A | 9.4 | 30 | one: 0.4 | acryl. acid ester | 8.0 |
| | 11 | A | 9.4 | 30 | one: 0.8 | acryl. acid ester | 8.0 |
| | 12 | A | 9.4 | 30 | one: 1.2 | acryl. acid ester | 8.0 |
| | 13 | A | 9.4 | 30 | one: 1.8 | acryl. acid ester | 8.0 |
| | 14 | A | 9.4 | 30 | both: 0.4 | vinyl carboxylate ester | 8.0 |
| | 15 | A | 9.4 | 30 | both: 0.4 | vinyl ether | 8.0 |
| | 16 | A | 9.4 | 30 | both: 0.4 | styrene | 8.0 |
| | 17 | A | 9.4 | 30 | both: 0.4 | acrylamide | 8.0 |
| | 18 | A | 14.5 | 30 | both: 0.4 | epoxy | 8.0 |
| | 19 | A | 9.4 | 30 | both: 0.4 | acryl. acid ester | 1.0 |

TABLE 3-continued

| | Ex. no. | Sheet | Si content in bath (wt %) | Amount of plating of one side ($g/m^2$) | Composite chromate film thickness ($\mu m$) (one or each of both sides) | Major resin of composite chromater film | Resin/chromium ratio |
|---|---|---|---|---|---|---|---|
| | 20 | A | 9.4 | 30 | both: 0.4 | acryl. acid ester | 4.0 |
| | 21 | A | 9.4 | 30 | both: 0.4 | acryl. acid ester | 12.0 |
| | 22 | A | 9.4 | 30 | both: 0.4 | acryl. acid ester | 18.0 |
| Comp. | 23 | A | 1.5 | 30 | both: 0.4 | acryl. acid ester | 8.0 |
| Exs | 24 | A | 16.0 | 30 | both: 0.4 | acryl. acid ester | 8.0 |
| | 25 | A | 9.4 | 60 | both: 0.4 | acryl. acid ester | 8.0 |
| | 26 | A | 9.4 | 30 | both: 0.05 | acryl. acid ester | 8.0 |
| | 27 | A | 9.4 | 30 | both: 2.3 | acryl. acid ester | 8.0 |
| | 28 | A | 9.4 | 30 | one: 2.3 | acryl. acid ester | 8.0 |

1) Si content was practically identical in bath and in aluminizing layer.
2) Resin/chromium ratio based on cured weight ratio of resin/chromium; chromium based on metallic chromium.
3) Underlined values are outside of range of the invention.

TABLE 4

| | No. | Sheet | Press formability | Weldability Spot | Weldability Seam | Corrosion resistance | Overall evaluation |
|---|---|---|---|---|---|---|---|
| Invention | 1 | A | ○ | ○ | ○ | ○ | ⊚ |
| Exs. | 2 | B | ○ | ○ | ○ | ○ | ⊚ |
| | 3 | A | ○ | ○ | ○ | ○ | ⊚ |
| | 4 | A | ○ | ○ | ○ | ○ | ⊚ |
| | 5 | A | ○ | Δ | Δ | ○ | ○ |
| | 6 | A | ○ | ○ | ○ | ○ | ⊚ |
| | 7 | A | ○ | ○ | ○ | ○ | ⊚ |
| | 8 | A | ○ | Δ | Δ | ○ | ⊚ |
| | 9 | A | ○ | ○ | ○ | ○ | ⊚ |
| | 10 | A | ○ | ○ | ○ | ○ | ⊚ |
| | 11 | A | ○ | ○ | ○ | ○ | ⊚ |
| | 12 | A | ○ | ○ | ○ | ○ | ⊚ |
| | 13 | A | ○ | ○ | ○ | ○ | ⊚ |
| | 14 | A | ○ | ○ | ○ | ○ | ⊚ |
| | 15 | A | ○ | ○ | ○ | ○ | ⊚ |
| | 16 | A | ○ | ○ | ○ | ○ | ⊚ |
| | 17 | A | ○ | ○ | ○ | ○ | ⊚ |
| | 18 | A | Δ | ○ | ○ | Δ | ○ |
| | 19 | A | ○ | Δ | Δ | ○ | ○ |
| | 20 | A | ○ | ○ | ○ | ○ | ⊚ |
| | 21 | A | ○ | ○ | ○ | ○ | ⊚ |
| | 22 | A | ○ | Δ | Δ | Δ | Δ |
| Comp. | 23 | A | x | ○ | ○ | ○ | x |
| Exs. | 24 | A | Δ | ○ | ○ | x | x |
| | 25 | A | Δ | x | x | ○ | x |
| | 26 | A | ○ | x | x | Δ | x |
| | 27 | A | ○ | x | x | ○ | x |
| | 28 | A | ○ | x | x | ○ | x |

* Overall evaluation
⊚: very excellent
○: excellent
Δ: somewhat inferior but usable
x: unusable

Examples 29–50

Sheets comprising the components listed in Table 1 were used to fabricate cold-rolled sheets in the same manner as Example 1, and these were aluminized in the same manner as Example 1.

The aluminized steel sheets thus fabricated were coated with a chromate treatment solution having one of the compositions listed in Table 5 to a prescribed the amount of coating using a roll coater or a linger roll after immersion, and were then baked and dried with hot air at 150° C.

TABLE 5

Composition of chromate treatment bath by process of the invention

| | Chromic acid | Conc. | Organic polymer compound | Phosphoric acid compound | Silica | Phosphonic acid |
|---|---|---|---|---|---|---|
| Example Solution C | Reduced chromic acid $Cr^{3+}/Cr^{6+}$ 5.5/4.5 | 20 g/l | Polyacrylic acid 5 g/l | Phosphoric acid 60 g/l | Colloidal silica 10 g/l | — |
| Example Solution D | Reduced chromic acid $Cr^{3+}/Cr^{6+}$ 5.0/5.0 | 60 g/l | Polyacrylic acid 3 g/l | Phosphoric acid 60 g/l | Colloidai silica 60 g/l | 1-hydroxyethylidene-1,1-diphosphonic acid 3.0 g/l |
| Exampie Solution E | Reduced chromic acid $Cr^{3+}/Cr^{6+}$ 5.5/4.5 | 20 g/l | Epoxy-acrylic acid copolymer 20 g/l | Phosphoric acid 60 g/l | Colloidal silica 60 g/l | 1-hydroxyethylidene-1,1-diphosphonic acid 5.0 g/l |
| Example Solution F | Reduced chromic acid $Cr^{3+}/Cr^{6+}$ 5.8/4.2 | 20 g/l | Polyamine acrylic acid 90 g/l | Phosphoric acid 20 g/l | Colloidal silica 30 g/l | |
| Example Solution G | Chromic anhydride | 20 g/l | Polyacrylic acid 60 g/l | Phosphoric acid 60 g/l | Colloidal silica 60 g/l | 1-hydroxyethylidene-1,1-diphosphonic acid 1.5 g/l |
| Example Solution H | Reduced chromic acid $Cr^{3+}/Cr^{6+}$ 5.5/4.5 | 20 g/l | Vinyl acetate/ ethylene copolymer 30 g/l | Phosphoric acid 60 g/l | Colloidal silica 60 g/l | 1-hydroxyethylidene-1,1-diphosphonic acid 3.0 g/l |
| Example Solution I | Chromic anhydride | 20 g/l | Polyacrylic acid 100 g/l | Phosphoric acid 10 g/l | Colloidal silica 20 g/l | |
| Example Solution J | Chromic anhydride | 20 g/l | — | — | Colloidal silica 60 g/l | |

The suitability of steel sheets fabricated in the manner described above as fuel tanks was evaluated by the following method.

Weldability ①: Spot weldability evaluation

Weldability ②: Seam weldability evaluation

Press formability: Cylindrical drawing test A

Corrosion resistance: Plated steel sheet test

The results are shown in Tables 6 and 7. Tables 6 and 7 show that satisfactory performance was exhibited by all of the examples.

Examples 29–44 were materials with satisfactory resistance weldability required for automobile fuel tanks and also excellent press formability and corrosion resistance, and they are therefore very promising as new fuel tank materials and represent a major contribution to industry, as a solution to future difficulties involved with using Pb-based materials which have become an environmental problem.

TABLE 6

Performance evaluation results (for treatment on both sides)

| | No. | Sheet | Treatment solution | Ratio of resin to Cr (*1) (wt %) | Amount of Cr in chromate film ($mg/m^2$) | Weldability Spot | Weldability Seam | Press formability | Corrosion resistance | Overall evaluation |
|---|---|---|---|---|---|---|---|---|---|---|
| Present invention | 29 | A | solution C | 50 | 10 | ○ | ○ | ○ | ○ | ○ |
| | 30 | A | solution C | 50 | 30 | ○ | ○ | ○ | ◎ | ○ |
| | 31 | A | solution C | 50 | 72 | ◎ | ○ | ○ | ◎ | ◎ |
| | 32 | A | solution C | 50 | 120 | ◎ex | ○ | ○ | ◎ | ◎ |
| | 33 | A | solution C | 50 | 135 | ◎ex | ○ | ○ | ◎ | ◎ |
| | 34 | A | solution C | 50 | 200 | ◎ | ○ | ○ | ◎ | ◎ |
| | 35 | B | solution C | 50 | 75 | ◎ | ○ | ○ | ◎ | ◎ |
| | 36 | A | solution D | 5 | 110 | ◎ex | ○ | ○ | ◎ | ◎ |
| | 37 | A | solution E | 200 | 80 | ◎ex | ○ | ○ | ◎ | ◎ |
| | 38 | A | solution F | 450 | 25 | ○ | ○ | ○ | ◎ | ○ |
| | 39 | A | solution G | 300 | 75 | ◎ | ○ | ○ | ◎ | ◎ |
| | 40 | A | solution H | 150 | 30 | ◎ | ○ | ○ | ◎ | ◎ |
| Comp. | 41 | A | solution C | 50 | 4 | Δ | x | ○ | Δ | Δ |

TABLE 6-continued

Performance evaluation results (for treatment on both sides)

| | No. | Sheet | Treatment solution | Ratio of resin to Cr (*1) (wt %) | Amount of Cr in chromate film (mg/m$^2$) | Weldability Spot | Weldability Seam | Press formability | Corrosion resistance | Overall evaluation |
|---|---|---|---|---|---|---|---|---|---|---|
| Exs. | 42 | A | solution C | 50 | 250 | Δ | x | ○ | ⊚ | Δ |
| | 43 | A | solution I | 500 | 20 | Δ | x | ○ | Δ | Δ |
| | 44 | A | solution J | 0 | 70 | Δ | ○ | ○ | ⊚ | Δ |

*Overall evaluation
⊚: Very excellent
○: Excellent
Δ: Somewhat inferior but usable
x: Unusable
*1: Weight ratio of added resin to chromic acid in terms of Cr content.

TABLE 7

| | No. | Sheet | Treatment solution (*1) | Ratio of resin to Cr (*2) (wt %) | Amount of Cr in chromate film (mg/m$^2$) | Weldability Spot | Weldability Seam | Press formability | Corrosion resistance | Overall evalution |
|---|---|---|---|---|---|---|---|---|---|---|
| Present invention | 45 | A | solution C/ solution J | 50/0 | 25/15 | ○ | ○ | ⊚ | ⊚ | ○ |
| | 46 | A | solution C/ solution J | 50/0 | 75/20 | ⊚ | ○ | ⊚ | ⊚ | ⊚ |
| | 47 | A | solution C/ solution J | 50/0 | 135/100 | ⊚ | ○ | ⊚ | ⊚ | ⊚ |
| | 48 | A | solution E/ solution J | 200/0 | 85/20 | ⊚ | ○ | ⊚ | ⊚ | ⊚ |
| Comp. Exs. | 49 | A | solution C/ solution J | 50/0 | 4/4 | x | x | ⊚ | Δ | x |
| | 50 | A | solution C/ solution J | 50/0 | 250/160 | Δ | ○ | ⊚ | ⊚ | Δ |

Overall evaluation
⊚: Very excellent
○: Excellent
Δ: Somewhat inferior but usable
x: usable
: Indicates combination of one side/one side
: Weight ratio of added resin to chromic acid in terms of Cr content.

Examples 51–61

Sheets comprising the components listed in Table 8 were used to fabricate cold-rolled sheets in the same manner as Example 1, and these were subjected to hot dip aluminizing in the same manner as Example 1.

The aluminized steel sheets thus fabricated were immersed in a chromate treatment solution comprising 20 g/l $CrO_3$ and 60 g/l $SiO_2$, and the amount of coating was adjusted with a linger roll. They were then dried with hot air at 80° C.

TABLE 8

Plated sheet components (wt %)

| Sample | C | Si | Mn | P | S | Ti | Al | B | N |
|---|---|---|---|---|---|---|---|---|---|
| C | 0.0011 | 0.03 | 0.31 | 0.007 | 0.009 | 0.056 | 0.04 | 0.0002 | 0.0033 |
| D | 0.00200 | 0.09 | 0.32 | 0.008 | 0.011 | 0.040 | 0.04 | — | 0.0032 |

The suitability of steel sheets fabricated in the manner described above as fuel tanks was evaluated by the following method.

Press formability: Cylindrical drawing test A

Weldability ①: Spot weldability evaluation

Weldability ②: Brazing material spread

Corrosion resistance: Plated steel sheet test

The results are shown in Table 9. As seen in Table 9, when the amount of chromate film is too low satisfactory corrosion resistance cannot be obtained and the weldability is inferior. Conversely, when the amount of coating is too high the brazing material wettability is reduced.

The present invention materials have satisfactory corrosion resistance and press formability required for automobile fuel tanks and also suitability for a wide range of welding processes, and are therefore very promising as new fuel tank materials and represent a major contribution to industry, as a solution to future difficulties involved with using Pb-based materials which have become an environmental problem.

TABLE 9

| | Ex. | Sheet | Amount of Cr in chromate film ($mg/m^2$) | Press formability | Weldability: Spot | Weldability: Brazing material spread | Corrosion resistance | Overall evaluation |
|---|---|---|---|---|---|---|---|---|
| Examples | 51 | C | 10 | ○ | ○ | ◎ | ○ | ○ |
| | 52 | C | 18 | ○ | ○ | ◎ | ○ | ○ |
| | 53 | C | 20 | ○ | ○ | ◎ | ◎ | ◎ |
| | 54 | D | 20 | ○ | ○ | ◎ | ◎ | ◎ |
| | 55 | C | 30 | ○ | ○ | ◎ | ◎ | ◎ |
| | 56 | C | 31 | ○ | ○ | ○ | ◎ | ○ |
| | 57 | C | 34 | ○ | ○ | ○ | ◎ | ○ |
| Comp. | 58 | C | 35 | ○ | ○ | Δ | ◎ | Δ |
| Exs. | 59 | C | 40 | ○ | ○ | Δ | ◎ | Δ |
| | 60 | C | 5 | ○ | Δ | ◎ | Δ | Δ |
| | 61 | C | 70 | ○ | ○ | x | ◎ | Δ |

*Overall evaluation
◎: Very excellent
○: Excellent
Δ: Somewhat inferior but usable
x: Unusable Examples 62–90

Plating sheets comprising the components listed in Table 8 were used to fabricate cold-rolled sheets in the same manner as Example 1, and these were subjected to hot dip aluminizing in the same manner as Example 1.

Aluminized steel sheets produced in this manner were subjected to composite chromate treatment and inorganic chromate treatment with the baths of Tables 10 and 11 as the standard compositions. The film thicknesses (Cr amount of coatings) of both chromate films were adjusted by linger roll, and hot air at 80° C. was used for drying to complete the film.

The organic film treatment was a baking type commonly employed for epoxy resins, acrylic resins and polyethylene resins.

TABLE 10

| Lubricant-containing composite chromate treatment solution composition | Composite chromate treatment solution concentration |
|---|---|
| Resin | 60–180 g/l |
| Chromic acid | 5–60 g/l |
| Phosphoric acid | 10–60 g/l |
| Colloidal silica | 5–20 g/l |
| Lubricant | 0.1–50 g/l |

TABLE 11

| Inorganic chromate treatment solution composition | Inorganic chromate treatment solution concentration |
|---|---|
| Chromic acid | 10–100 g/l |
| Phosphoric acid (containing organic phosphoric acid) | 0–60 g/l |
| Colloidal silica | 15–250 g/l |

The performance of steel sheets produced in this manner as fuel tanks was evaluated. The evaluation method used here was the following. The plating conditions and performance evaluation results are shown in Table 12.

Press formability ①: Cylindrical drawing test B

Press formability ②: Bowden friction coefficient measurement

Corrosion resistance: Plated steel sheet test

Examples 62–90 provided hot dip aluminized steel sheets with the press formability and corrosion resistance required for automobile fuel tanks and also excellent welding properties, and they are therefore very promising as new fuel tank materials and represent a major contribution to industry, as a solution to future difficulties involved with using Pb-based materials which have become an environmental problem.

TABLE 12

| | No. | Sheet | Si content of plating layer[1] (wt %) | Amount of plating per side ($g/m^2$) | Composite chromate film: Film thickness per side ($\mu m$) | Composite chromate film: Main resin | Composite chromate film: Lubricant: Type | Composite chromate film: Lubricant: Amount (wt %) | Sides treated | Opposite side treatment for one-sided composite chromate films | Press formability: Cylin. drawing | Press formability: Bowden friction | Corrosion resistance | Overall evaluation[2] |
|---|---|---|---|---|---|---|---|---|---|---|---|---|---|---|
| Exs. | 62 | C | 9.4 | 30 | 0.4 | acrylic acid ester | stearic acid | 0.5 | both | | ○ | ○ | ◎ | ○ |
| | 63 | D | 9.4 | 30 | 0.4 | acrylic acid ester | stearic acid | 1 | | | ◎ | ◎ | ◎ | ◎ |
| | 64 | C | 5.2 | 30 | 0.4 | acrylic acid ester | stearic acid | 5 | | | ◎ | ◎ | ◎ | ◎ |
| | 65 | C | 11.4 | 30 | 0.4 | acrylic acid ester | stearic acid | 10 | | | ◎ | ◎ | ◎ | ◎ |
| | 66 | C | 0.4 | 30 | 0.4 | acrylic acid ester | stearic acid | 20 | | | ◎ | ◎ | ◎ | ◎ |
| | 67 | C | 9.4 | 30 | 0.2 | acrylic acid ester | ester | 10 | | | ◎ | ◎ | ◎ | ◎ |
| | 68 | C | 9.4 | 30 | 0.8 | acrylic acid ester | ester | 5 | one | $CrO_3$—$SiO_2$-based inorganic chromate | ○ | ◎ | ◎ | ○ |
| | 69 | C | 9.4 | 30 | 1.2 | acrylic acid ester | silicon | 1 | both | | ◎ | ◎ | ◎ | ◎ |
| | 70 | C | 9.4 | 30 | 0.2 | acrylic acid ester | silicon | 3 | | | ◎ | ◎ | ◎ | ◎ |
| | 71 | C | 9.4 | 30 | 0.4 | acrylic acid ester | silicon | 8 | | | ◎ | ◎ | ◎ | ◎ |
| | 72 | C | 9.4 | 30 | 0.8 | acrylic acid ester | silicon | 15 | | | ◎ | ◎ | ◎ | ◎ |
| | 73 | C | 9.4 | 30 | 1.2 | acrylic acid ester | paraffin brazing filler | 5 | one | Epoxy film, $1\mu$ application | ◎ | ◎ | ◎ | ◎ |
| | 74 | C | 9.4 | 30 | 1.8 | acrylic acid ester | special olefin | both | | | ◎ | ◎ | ◎ | ◎ |
| | 75 | C | 9.4 | 30 | 0.4 | vinyl carb-oxylate ester | special olefin | 3 | | | ◎ | ◎ | ◎ | ◎ |
| | 76 | C | 9.4 | 30 | 0.4 | vinyl ether | special olefin | 8 | | | ◎ | ◎ | ◎ | ◎ |
| | 77 | C | 9.4 | 30 | 0.4 | styrene olefin | special | 12 | | | ◎ | ◎ | ◎ | ◎ |
| | 78 | C | 9.4 | 30 | 0.4 | acryla-mide | stearic acid | 0.5 | | | ○ | ○ | ◎ | ○ |
| | 79 | C | 14.5 | 30 | 0.4 | epoxy acid | stearic | 1 | | | ◎ | ◎ | ◎ | ◎ |
| | 80 | C | 9.4 | 65 | 0.4 | acrylic acid ester | stearic acid | 5 | | | ◎ | ◎ | ◎ | ○[3] |
| | 81 | C | 9.4 | 60 | 0.4 | acrylic acid ester | stearic acid | 10 | | | ◎ | ◎ | ◎ | ◎ |
| | 82 | C | 9.4 | 20 | 0.4 | acrylic acid ester | stearic acid | 18 | | | ◎ | ◎ | ◎ | ◎ |
| Comp. Exs. | 83 | C | 1.5 | 30 | 0.4 | acrylic acid ester | not added | 0 | | | x | Δ | x | x |
| | 84 | C | 16.0 | 30 | 0.4 | acrylic acid ester | stearic acid | 0.3 | | | Δ | ○ | x | x |
| | 85 | C | 9.4 | 70 | 0.4 | acrylic | not | 0 | | | x | Δ | Δ | x |

TABLE 12-continued

| No. | Sheet | Si content of plating layer*1) (wt %) | Amount of plating per side ($g/m^2$) | Composite chromate film: Film thickness per side ($\mu m$) | Main resin | Lubricant: Type | Lubricant: Amount (wt %) | Sides treated | Opposite side treatment for one-sided composite chromate films | Press formability: Cylin. drawing | Press formability: Bowden friction | Corrosion resistance | Overall evaluation*2) |
|---|---|---|---|---|---|---|---|---|---|---|---|---|---|
| | | | | | acid ester | added | | | | | | | |
| 86 | C | 9.4 | 30 | 0.05 | acrylic acid ester | not added | 0 | | | x | x | x | x |
| 87 | C | 9.4 | 30 | 2.3 | acrylic acid ester | stearic acid | 0.3 | | | Δ | Δ | ◎ | x(poor welding) |
| 88 | C | 9.4 | 65 | 0.08 | acrylic acid ester | not added | 0 | | | x | x | Δ | x |
| 89 | C | 9.4 | 30 | 0.05 | epoxy | not added | 0 | | | x | x | Δ | x |
| 90 | C | 9.4 | 30 | 2.3 | acrylic acid ester | not added | 0 | | | Δ | Δ | ◎ | x(poor welding) |

*1)Plating layer Si content = Si/Al + Si (wt %), determined by chemical analysis.
*2)Weldability also considered in overall evaluation, press property, corrosion resistance; ◎: very excellent, ○: excellent, Δ: somewhat poor but usable, x: unusable.
*3)Weldability somewhat poor, but usable.

Examples 91–119

Sheets comprising the components listed in Table 8 were used to fabricate cold-rolled sheets in the same manner as Example 1, and these were subjected to hot dip aluminizing in the same manner as Example 1.

Aluminized steel sheets produced in this manner were subjected to inorganic-based chromate treatment and composite chromate treatment with the bath of Table 13 as the standard composition. The amount of chromate film and composite chromate film thicknesses were adjusted by linger roll, and hot air at 80° C. was used for drying to complete each film.

TABLE 13

| Compositions of inorganic-based chromate films and resin chromate treatment solutions | Inorganic-based chromate treatment solution concentration | Composite chromate treatment solution concentration |
|---|---|---|
| Resin | — | 60–180 g/l |
| Chromic acid | 15–50 g/l | 5–60 g/l |
| Phosphoric acid | 10–30 g/l | 10–60 g/l |
| Colloidal silica | 10–200 g/l | 5–20 g/l |

The performance of steel sheets produced in this manner as fuel tanks was evaluated by the following method. The treatment conditions and performance evaluation results are shown in Table 17.

Press formability: Cylindrical drawing test A

Weldability: Spot weldability evaluation

Corrosion resistance: Plated steel sheet test

Corrosion resistance: Flaw corrosion resistance test

As shown in Table 14, when the Si content of the plating is too low (Comparative Example 113) the alloy layer grows too much, resulting in peeling of the plating during working. Conversely, when the Si content is too high (Comparative Example 114), the corrosion resistance is impaired. When the amount of aluminum plating is too great (Comparative Example 117) the welding section is inferior. When the composite chromate film thickness is too small (Comparative Examples 115, 177) or too large (Comparative Examples 116, 119), satisfactory weldability cannot be obtained. Satisfactory weldability also cannot be obtained when the inorganic-based chromate film thickness is too large (Comparative Example 118).

Examples 91–119 provide hot dip aluminized steel sheets which have both the corrosion resistance and press formability required for automobile fuel tank materials, as well as achieving improved weldability which has been a problem in the past, and they are therefore very promising as new fuel tank materials and represent a major contribution to industry, as a solution to future difficulties involved with using Pb-based materials which have become an environmental problem.

Regarding the amount of the composite chromate films in Examples 91–119, with a Cr content of less than 10 $mg/m^2$ the effect of corrosion resistance is insufficient, raising concerns of corrosion in plating layer cracks during working. Also, the plating metal tends to adhere to the electrode during spot welding, thus impairing continuous operation. An amount of 10 $mg/m^2$ or greater gives good corrosion resistance and resistance weldability as a fuel tank, but at 80 $mg/m^2$ or greater the resistance weldability is even better. On the other hand, if the amount of coating exceeds 200 $mg/m^2$ the corrosion resistance is satisfactory but the increased resistance value between the steel sheets due to the large film thickness results in poor electrization (electric current passing) and local overelectrization, creating problems such as poorer continuous operation. The amount of coating is preferably no greater than 140 $mg/m^2$. From this viewpoint, therefore, the present inventors determined the range to be from 10 $mg/m^2$ to 200 $mg/m^2$, and more preferably from 80 $mg/m^2$ to 140 $mg/m^2$.

TABLE 14

| | Ex. No. | Sheet | Si content of plating layer[1)] (wt %) | Amount of Al-based plating per side (g/$m^2$) | Inorganic-based chromate film side: Amount of chromate film (mg/$m^2$) | Inorganic-based chromate film side: Type | Composite chromate film side | Composite chromate film side: Main resin | Inorganic-based chromate film between composite chromate and plating layer: Amount of Chromate film (mg/$m^2$) | Inorganic-based chromate film between composite chromate and plating layer: Type |
|---|---|---|---|---|---|---|---|---|---|---|
| Inven- | 91 | C | 9.4 | 30 | 15 | $CrO_3$—$SiO_2$- | 0.4 | acrylic acid ester | — | — |
| tion | 92 | D | 9.4 | 30 | 15 | based | 0.4 | acrylic acid ester | — | — |
| Exs. | 93 | C | 5.2 | 30 | 20 | | 0.4 | acrylic acid ester | — | — |
| | 94 | C | 11.4 | 30 | 20 | | 0.4 | acrylic acid ester | — | — |
| | 95 | C | 9.4 | 45 | 50 | | 0.4 | acrylic acid ester | — | — |
| | 96 | C | 9.4 | 30 | 50 | $CrO_3$—$SiO_2$- | 0.4 | acrylic acid ester | 15 | $CrO_3$—$SiO_2$-based |
| | 97 | C | 9.4 | 30 | 50 | phosphoric | 0.4 | acrylic acid ester | 15 | $CrO_3$—$SiO_2$-based |
| | 98 | C | 9.4 | 30 | 75 | acid-based | 1.2 | acrylic acid ester | 20 | $CrO_3$—$SiO_2$-based |
| | 99 | C | 9.4 | 30 | 120 | | 0.2 | acrylic acid ester | 60 | $CrO_3$—$SiO_2$-phosphoric acid-based |
| | 100 | C | 9.4 | 30 | 200 | | 0.4 | acrylic acid ester | 100 | $CrO_3$—$SiO_2$-organic phosphoric acid-based |
| | 101 | C | 9.4 | 30 | 50 | $CrO_3$—$SiO_2$- | 0.8 | acrylic acid ester | — | — |
| | 102 | C | 9.4 | 30 | 50 | organic | 1.2 | acrylic acid ester | — | — |
| | 103 | C | 9.4 | 30 | 75 | phosphoric | 1.8 | acrylic acid ester | — | — |
| | 104 | C | 9.4 | 30 | 75 | acid-based | 0.4 | vinyl carboxylate ester | — | — |
| | 105 | C | 9.4 | 30 | 75 | | 0.4 | vinyl ether | — | — |
| | 106 | C | 9.4 | 30 | 100 | $CrO_3$—$SiO_2$- | 0.4 | styrene | — | — |
| | 107 | C | 9.4 | 30 | 100 | based | 0.4 | acrylamide | — | — |
| | 108 | C | 14.5 | 30 | 150 | | 0.4 | epoxy | — | — |
| | 109 | C | 9.4 | 65 | 15 | $CrO_3$—$SiO_2$- | 0.4 | acrylic acid ester | — | — |
| | 110 | C | 9.4 | 60 | 15 | acrylic | 0.4 | acrylic acid ester | — | — |
| | 111 | C | 9.4 | 70 | 5 | resin-based | 0.4 | acrylic acid ester | — | — |
| | 112 | C | 9.4 | 20 | 10 | | 0.4 | acrylic acid ester | — | — |
| Comp. | 113 | C | 1.5 | 30 | — | — | 0.4 | acrylic acid ester | — | — |
| Exs. | 114 | C | 16.0 | 30 | 15 | $CrO_3$—$SiO_2$- | 0.4 | acrylic acid ester | — | — |
| | 115 | C | 9.4 | 30 | 20 | based | 0.05 | acrylic acid ester | — | — |
| | 116 | C | 9.4 | 30 | — | — | 2.3 | acrylic acid ester | — | — |
| | 117 | C | 9.4 | 65 | 15 | $CrO_3$—$SiO_2$- | 0.08 | acrylic acid ester | — | — |
| | 118 | C | 9.4 | 30 | 250 | based | 0.4 | epoxy | — | — |
| | 119 | C | 9.4 | 30 | 15 | | 2.3 | acrylic acid ester | 140 | $CrO_3$—$SiO_2$-based |

| | Ex No. | Combination of steel sheets for welding[2)] | press formability | Spot weldability | Corrosion resistance: Evaluated side: composite chromate side | Corrosion resistance: Evaluated side: inorganic-based chromate side | Flaw corrosion resisitance: Evaluated side: composite chromate side | Flaw corrosion resisitance: Evaluated side: inorganic-based chromate side | Overall evaluation |
|---|---|---|---|---|---|---|---|---|---|
| Invention | 91 | C | ⊚ | ⊚ | ⊚ | ⊚ | ○ | ○ex | ⊚ |
| Exs. | 92 | C | ⊚ | ⊚ | ⊚ | ⊚ | ○ | ○ex | ⊚ |
| | 93 | C | ⊚ | ⊚ | ⊚ | ⊚ | ○ | ○ex | ⊚ |
| | 94 | C | ⊚ | ⊚ | ⊚ | ⊚ | ○ | ○ex | ⊚ |
| | 95 | C | ⊚ | ⊚ | ⊚ | ⊚ | ○ | ○ex | ⊚ |
| | 96 | D | ⊚ | ⊚ | ⊚ | ⊚ | ○ex | ○ex | ⊚ |
| | 97 | E | ⊚ | ⊚ | ⊚ | ⊚ | ○ex | ○ex | ⊚ |
| | 98 | C | ⊚ | ⊚ex | ⊚ | ⊚ | ○ex | ○ex | ⊚ |
| | 99 | C | ⊚ | ⊚ex | ⊚ | ⊚ | ○ex | ○ex | ⊚ |
| | 100 | C | ⊚ | ⊚ | ⊚ | ⊚ | ○ex | ○ex | ⊚ |
| | 101 | C | ⊚ | ⊚ | ⊚ | ⊚ | ○ | ○ex | ⊚ |
| | 102 | C | ⊚ | ⊚ | ⊚ | ⊚ | ○ | ○ex | ⊚ |
| | 103 | C | ⊚ | ⊚ex | ⊚ | ⊚ | ○ | ○ex | ⊚ |
| | 104 | C | ⊚ | ⊚ex | ⊚ | ⊚ | ○ | ○ex | ⊚ |
| | 105 | C | ⊚ | ⊚ex | ⊚ | ⊚ | ○ | ○ex | ⊚ |
| | 106 | C | ⊚ | ⊚ex | ⊚ | ⊚ | ○ | ○ex | ⊚ |
| | 107 | C | ⊚ | ⊚ex | ⊚ | ⊚ | ○ | ○ex | ⊚ |
| | 108 | C | Δ | ⊚ | Δ | Δ | ○ | ○ex | ○ |
| | 109 | C | ⊚ | ○ | ⊚ | ⊚ | ○ | ○ex | Δ |
| | 110 | C | ⊚ | ⊚ | ⊚ | ⊚ | ○ | ○ex | ⊚ |
| | 111 | C | ⊚ | ○ | ⊚ | Δ | ○ | ○ | Δ |
| | 112 | C | ⊚ | ⊚ | ⊚ | ⊚ | ○ | ○ | ○ |
| | 113 | C | X | ⊚ | ⊚ | Δ | ○ | Δ | X |

TABLE 14-continued

| | | | | | | | | | |
|---|---|---|---|---|---|---|---|---|---|
| Comp. Exs. | 114 | C | ○ | ◎ | X | X | ○ | Δ | X |
| | 115 | C | ◎ | X | X | ◎ | X | ○ex | X |
| | 116 | C | ◎ | X | ◎ | Δ | ○ | Δ | X |
| | 117 | C | ○ | X | ◎ | ◎ | Δ | ○ | X |
| | 118 | C | ◎ | X | ◎ | ◎ | ○ | ○ex | X |
| | 119 | C | ◎ | X | ◎ | ◎ | ○ex | ○ex | X |

1) Plating layer Si content = Si/Al + Si (wt %), determined by chemical anaylsis.
2) Steel sheet combination:
Composite chromate treated side between steel sheets: C,
Inorganic-based chromate treated side: D,
One side composite chromate treated side, other side inorganic chromate treated side: E
*Overall evaluation
◎: very excellent,
○: excellent,
Δ: somewhat poor but usable,
x: unusable

Examples 120–141

Actual fuel tanks come in a variety of different shapes, and are not standardized. Thus, several types of differently worked fuel tanks were produced using as materials hot dip aluminized steel sheets (thickness: 0.8 mm) with different steel components, plating compositions and resin films, and Pb—Sn alloy-plated steel sheets. The Pb content was 0.001% as the impurity in the aluminizing layers of the hot dip aluminized steel sheets. The sheet thickness reduction was evaluated for quantification of the extent of working. The extent of working was evaluated as the maximum value of the sheet thickness reduction calculated upon measuring the sheet thickness at each site before and after forming. Spot welding and brazing were used for joining of the details after forming. The steel components of the materials used are listed in Table 15, the resin film descriptions in Table 16 and the fuel tank production conditions in Table 17.

TABLE 15

| | Components of plated sheets (wt %) | | | | | | | | |
|---|---|---|---|---|---|---|---|---|---|
| Sample | C | Si | Mn | P | S | Ti | Al | B | N |
| E | 0.0042 | 0.09 | 0.30 | 0.008 | 0.012 | 0.03 | 0.05 | 0.0002 | 0.0033 |
| F | 0.0009 | 0.03 | 0.32 | 0.007 | 0.011 | 0.03 | 0.04 | 0.0002 | 0.0032 |

TABLE 16

| Material description | | | | | | | | | |
|---|---|---|---|---|---|---|---|---|---|
| Tank material | Sheet | Plating composition | Amount of plating on one side (g/m²) | After-treatment | Treated sides | Resin system | Amount of Cr (mg/m²) | Resin thick-ness (μm) | Added components |
| A | E | Al-10% Si | 30 | composite | both | acrylic | 30 | 0.3 | phosphoric |
| B | F | Al-10% Si | 30 | chromate | | | 30 | 0.3 | acid, |
| C | E | Al-6% Si | 30 | | | | 30 | 0.3 | silica |
| D | E | Al-12% Si | 30 | | | | 30 | 0.3 | |
| E | E | Al-10% Si | 20 | | | | 30 | 0.3 | |
| F | E | Al-10% Si | 50 | | | | 30 | 0.3 | |
| G | E | Al-10% Si | 20 | | | | 40 | 0.4 | |
| H | E | Al-10% Si | 20 | | | | 60 | 0.6 | |
| I | E | Al-10% Si | 20 | | | | 20 | 0.4 | |
| J | E | Al-10% Si | 30 | resin | | | 20 | 1.0 | silica |
| K | E | Al-10% Si | 30 | coating | | polyether | 20 | 1.0 | |
| L | E | Al-10% Si | 30 | | | epoxy | 20 | 1.0 | |
| M | E | Al-10% Si | 30 | | | acrylic | 10 | 1.0 | |
| N | E | Al-10% Si | 30 | | | | 20 | 0.6 | |
| O | E | Al-10% Si | 30 | | | | 20 | 1.8 | |
| P | E | Al-10% Si | 30 | | | | 20 | 1.0 | none |
| Q | E | Al-10% Si | 30 | composite chromate | one | | 30 | 0.3 | phosphoric acid, silica |
| R | E | Al-10% Si | 30 | chromate | both | — | 5 | — | — |

TABLE 16-continued

| | | | Material description | | | | | | |
|---|---|---|---|---|---|---|---|---|---|
| Tank material | Sheet | Plating composition | Amount of plating on one side ($g/m^2$) | After-treatment | Treated sides | Resin system | Amount of Cr ($mg/m^2$) | Resin thickness ($\mu m$) | Added components |
| S | E | Pb-8% Sn | 40 | phosphate | | — | — | — | — |
| T | E | Zn-10% Ni | 20 | chromate | | — | 50 | — | — |

1) Amount of coating, Cr amount of coating indicated per side.
2) Cr amount of coating: value in terms of metallic Cr.
3) Resin coating: resin coating after chromate.

TABLE 17

| Fuel tank production conditions and performance | | | | | | | |
|---|---|---|---|---|---|---|---|
| Ex. No. | | Material | Resin side | Sheet thickness reduction % | Corrosion resistance | Pb elution | Overall evaluation |
| Invention examples | 120 | A | — | 20 | ⊚ | ○ | ○ |
| | | | | 15 | ⊚ | ○ | |
| | | | | 8 | ⊚ | ○ | |
| | 121 | A | — | 20 | ⊚ | ○ | ○ |
| | 122 | B | — | 20 | ⊚ | ○ | ○ |
| | 123 | C | — | 20 | ⊚ | ○ | ○ |
| | 124 | D | — | 20 | ⊚ | ○ | ○ |
| | 125 | E | — | 20 | ⊚ | ○ | ○ |
| | 126 | F | — | 20 | ⊚ | ○ | ○ |
| | 127 | G | — | 20 | ⊚ | ○ | ○ |
| | 128 | H | — | 20 | ⊚ | ○ | ○ |
| | 129 | I | — | 20 | ⊚ | ○ | ○ |
| | 130 | J | — | 20 | ⊚ | ○ | ○ |
| | 131 | K | — | 20 | ⊚ | ○ | ○ |
| | 132 | L | — | 20 | ⊚ | ○ | ○ |
| | 133 | M | — | 20 | ⊚ | ○ | ○ |
| | 134 | N | — | 20 | ⊚ | ○ | ○ |
| | 135 | 0 | — | 20 | ⊚ | ○ | ○ |
| | 136 | P | — | 20 | ⊚ | ○ | ○ |
| | 137 | Q | inner | 20 | ⊚ | ○ | ○ |
| | 138 | Q | outer | 20 | ⊚-Δ | ○ | ○ |
| | | | | 20 | X | ○ | X |
| Comp. examples | 139 | R | — | 15 | Δ | ○ | |
| | | | | 8 | ⊚ | ○ | |
| | 140 | S | — | 20 | ⊚ | X | X |
| | 141 | T | — | 20 | X | ○ | X |

Overall evaluation: ○: excellent, X: unsuitable

The corrosion resistance and Pb elution were evaluated under the following conditions.

Weldability ①—Fuel tank test

Weldability ②—Pb elution

As shown in Table 17, the fuel tanks fabricated with aluminizing layers including no resin film had thick chromate coatings and therefore exhibited some degree of corrosion resistance with minimally worked shapes, but the corrosion resistance was worse with shapes of higher working to a sheet thickness reduction of 15% or greater, such as is common with actual fuel tanks (Comparative Example 139). While the corrosion resistance was satisfactory with the fuel tank employing a conventionally used Pb—Sn plated steel sheet (Comparative Example 140) and the one employing Pb—Sn based solder on an aluminized steel sheet (Comparative Example 141), Pb elution was a concern. The corrosion resistance was notably poor with the fuel tank made of a material coated with Zn—Ni chromate. When a material having a resin film on an aluminizing layer was formed and an Al-based brazing material material was used, there was no concern of Pb elution and a fuel tank with excellent corrosion resistance after working was obtained. However, Example 135 required some change in pressure force and current value for welding, which impeded productivity during welding.

Examples 120–141 eliminated concerns of Pb contamination of the environment which has become a problem recently, and provided fuel tanks with excellent corrosion resistance even under forming into complex shapes. They also represent a major contribution to industry as a response to increasing calls for environmental conservation.

Examples 142–155

Cold-rolled steel sheets fabricated according to Example 1 using sheets with the composition listed in Table 18 were coated with hot dip aluminizing on both sides in the manner of Example 1. One of the sides of each aluminized material was also subjected to Belder grinding to prepare a one side-coated material.

TABLE 18

| | Plated sheet composition (wt %) | | | | | | | | |
|---|---|---|---|---|---|---|---|---|---|
| Sample | C | Si | Mn | P | S | Ti | Al | B | N |
| G | 0.0011 | 0.03 | 0.31 | 0.007 | 0.009 | 0.054 | 0.04 | 0.0002 | 0.0033 |

Each aluminized steel sheet thus fabricated was coated with one of different treatment solutions to a prescribed amount of coating using a roll coater or a linger roll after immersion, and was then baked and dried with hot air at 200° C. The seam weldability of these resin-coated aluminized steel sheets was evaluated by the following method.

Weldability—seam weldability evaluation

The results are listed in Table 19. As seen in Table 19, all of the examples exhibited satisfactory seam weldability.

Examples 142–155 provided seam welding methods required for automobile fuel tank materials, and they are therefore very promising as new fuel tank materials and represent a major contribution to industry, as a solution to future difficulties involved with using Pb-based materials which have become an environmental problem.

In examples 142–155, the chromic acid addition amounts are not particularly restricted but are best at from 10 mg/m$^2$ to 200 mg/m$^2$ in terms of Cr. At less than 10 mg/m$^2$ the effect of addition is insufficient, and with an amount of 10 mg/m$^2$ or greater the fuel tank has good corrosion resistance and resistance weldability, but the resistance weldability is even better at greater than 70 mg/m$^2$. On the other hand, if the amount of coating is greater than 200 mg/m$^2$ the proportion of inorganic matter in the film increases, and therefore despite satisfactory corrosion resistance there will be problems of local overelectrization and reduced continuous operation. The amount of coating is preferred to be no greater than 140 mg/m$^2$. From this viewpoint, therefore, the range was determined to be from 10 mg/m$^2$ to 200 mg/m$^2$, and more preferably from 80 mg/m$^2$ to 140 mg/m$^2$.

TABLE 19

Coating conditions and evaluation results

| | | Upper sheet | | | Lower sheet | | | |
|---|---|---|---|---|---|---|---|---|
| | Ex. No. | Amount of plating (electrode side/steel sheet side (g/m$^2$) | Resin coating conditions (electrode side/steel sheet side) (g/m$^2$) | Resin film thickness (μm) | Amount of plating (electrode side/steel sheet side (g/m$^2$) | Resin coating conditions (electrode side/steel sheet side) (g/m$^2$) | Resin film thickness (μm) | Seam weldability |
| Present invention | 142 | 40/40 | epoxy resin/epoxy resin | 0.5 | 40/40 | epoxy resin/epoxy resin | 0.5 | ⊚ |
| | 143 | 30/30 | none/epoxy resin | 0.5 | 30/30 | none/none | — | Δ |
| | 144 | 30/30 | epoxy resin/none | 0.5 | none/30 | none/none | — | ⊚ |
| | 145 | 30/30 | acrylic resin/acrylic resin | 0.5 | none/30 | acrylic resin/acrylic resin | 0.5 | ⊚ |
| | 146 | none/10 | epoxy resin/epoxy resin | 0.1 | none/10 | epoxy resin/epoxy resin | 0.1 | ⊚ |
| | 147 | 30/30 | chromate composite acrylic resin/chromate composite acrylic resin chromate content (Cr content): 20 mg/m$^2$ | 0.5 | 30/30 | chromate composite acrylic resin/chromate composite acrylic resin chromate content (Cr content): 20 mg/m$^2$ | 0.5 | ○ |
| | 148 | 30/30 | chromate composite acrylic resin/chromate composite acrylic resin chromate content (Cr content): 80 mg/m$^2$ | 0.5 | 30/30 | chromate composite acrylic resin/chromate composite acrylic resin chromate content (Cr content): 80 mg/m$^2$ | 0.5 | ⊚ |
| | 149 | 30/30 | chromate composite acrylic resin/chromate composite acrylic resin chromate content (Cr content): 140 mg/m$^2$ | 0.5 | 30/30 | chromate composite acrylic resin/chromate composite acrylic resin chromate content (Cr content): 140 mg/m$^2$ | 0.5 | ⊚ |
| | 150 | 30/30 | chromate composite acrylic resin/chromate composite acrylic resin chromate content (Cr content): 200 mg/m$^2$ | 0.5 | 30/30 | chromate composite acrylic resin/chromate composite acrylic resin chromate content (Cr content): 200 mg/m$^2$ | 0.5 | ○ |
| | 151 | 30/30 | chromate composite acrylic resin/chromate composite acrylic resin chromate content (Cr content): 250 mg/m$^2$ | 0.5 | 30/30 | chromate composite acrylic resin/chromate composite acrylic resin chromate content (Cr content): 250 mg/m$^2$ | 0.5 | Δ |
| | 152 | 60/60 | epoxy resin/epoxy resin | 0.5 | 60/60 | epoxy resin/epoxy resin | 0.5 | Δ |
| | 153 | 50/50 | polyethylene resin/polyethylene resin | 2.0 | 50/50 | polyethylene resin/polyethylene resin | 2.0 | ○ |
| Comp. Exs. | 154 | 50/50 | chromate film/chromate film (Cr content: 20 mg/m$^2$) | — | 50/50 | chromate film/chromate film (Cr content: 20 mg/m$^2$) | — | X |
| | 155 | 30/30 | — | 0.5 | 30/30 | — | 0.5 | X |

What is claimed is:

1. A coated aluminized steel sheet suitable for fuel tanks, which consists of, in combination:

(a) a steel sheet, (b) an aluminizing layer formed on one or both sides of said steel sheet and based on aluminum or an aluminum alloy containing 2–15 wt % silicon, and (c) a coating layer formed on at least one of said aluminizing layers, said coating layer being one or more films selected from the group consisting of:

i) an organic and inorganic composite chromate film having a film thickness of 0.1–2 μm and containing a resin and a chromic acid compound, with the re sin/metal chromium weight ratio in the range of 0.5–18, ii) an inorganic-based chromate film A with the coating layer formed to 10–200 mg/m$^2$ in terms of metallic chromium, which comprises 100 parts by weight of chromic acid in terms of metallic chromium and 100–1000 parts by weight of colloidal silica, and further comprises at least one selected from the group consisting of 100–600 parts by weight of a phosphoric acid compound, 10–200 parts by weight of a phosphonic acid or phosphonic acid salt compound and less than 50 parts by weight of an organic resin, and iii) an inorganic-based chromate film B with a coating amount of at least 10 mg/m$^2$ and less than 35 mg/m$^2$ in terms of metallic chromium.

2. A coated aluminized steel sheet according to claim 1, wherein said aluminizing layer is formed to 60 g/m$^2$ or less.

3. A coated aluminized steel sheet according to claim 1, wherein said composite chromate film further contains 0.5–20 wt % of a lubricant.

4. A coated aluminized steel sheet according to claim 1, wherein said composite chromate film further contains 100–600 parts by weight of a phosphoric acid compound and 100–1000 parts by weight of colloidal silica with respect to 100 parts by weight of metallic chromium.

5. A coated aluminized steel sheet according to claim 4, wherein said composite chromate film further contains 10–200 parts by weight of a phosphonic acid or phosphonic acid salt compound with respect to 100 parts by weight of metallic chromium.

6. A coated aluminized steel sheet according to claim 1, which has said aluminizing layer on both sides of said steel sheet and which has said composite chromate film on the aluminizing layers on both sides.

7. A coated aluminized steel sheet according to claim 1 which has said aluminizing layer on both sides of said steel sheet, and which has said inorganic-based chromate film A on said aluminizing layers on both sides.

8. A coated aluminized steel sheet according to claim 1, which has said aluminizing layer on both sides of said steel sheet and which has said composite chromate film on said aluminizing layer on one side and an inorganic-based chromate film C with a coating amount of 200 $mg/m^2$ or less in terms of metallic chromium on said aluminizing layer on the other side.

9. A coated aluminized steel sheet according to claim 8, wherein said inorganic-based chromate film C formed on said aluminizing layer further contains at least one selected from the group consisting of phosphoric acid compounds, phosphonic acid and phosphonic acid salt compounds, and less than 50 parts by weight of a resin with respect to 100 parts by weight of metallic chromium.

10. A coated aluminized steel sheet according to claim 1, which has an inorganic-based chromate film C with a coating amount of 100 $mg/m^2$ or less in terms of metallic chromium between said aluminizing layer and said composite chromate film.

11. A coated aluminized steel sheet according to claim 10, wherein said inorganic-based chromate film C formed between said aluminizing layer and said composite chromate film further contains at least one selected from the group consisting of phosphoric acid compounds, phosphonic acid and phosphonic acid salt compounds, and less than 10 parts by weight of a resin with respect to 100 parts by weight of metallic chromium.

12. A coated aluminized steel sheet according to claim 1, which has said aluminizing layer on both sides of said steel sheet, and which has said inorganic-based chromate film B formed to 10–35 $mg/M^2$ in terms of metallic chromium on said aluminizing layers on both sides.

13. A coated aluminized steel sheet according to claim 1, which has said aluminizing layer on both sides of said steel sheet, and which has said composite chromate film on said aluminizing layer on one side and an inorganic resin film with a thickness of 0.1–2.0 $\mu$m on said aluminizing layer on the other side.

14. A coated aluminized steel sheet according to claim 13, which has an inorganic-based chromate film C with a coating amount of 100 $mg/m^2$ or less in terms of metallic chromium between said aluminizing layer and at least one of said composite chromate film and said organic resin film.

15. A coated aluminized steel sheet according to claim 14, wherein said inorganic-based chromate film C formed on said aluminizing layer further contains at least one selected from the group consisting of phosphoric acid compounds, phosphonic acid and phosphonic acid salt compounds, and less than 50 parts by weight of a resin with respect to 100 parts by weight of metallic chromium.

16. A coated aluminized steel sheet according to claim 1, which has said aluminizing layer on both sides of said steel sheet and which has said inorganic-based chromate film B on said aluminizing layer on one side and an organic-based resin film on said aluminizing layer on t he other side.

17. A coated aluminized steel sheet according to claim 16, wherein said inorganic-based chromate film B is formed to 200 $mg/m^2$ in terms of metallic chromium.

18. A coated aluminized steel sheet according to claim 17, wherein said inorganic-based chromate film formed on said aluminizing layer further contains at least one selected from the group consisting of phosphoric acid compounds, phosphonic acid and phosphonic acid salt compounds, and less than 50 parts by weight of a resin with respect to 100 parts by weight of metallic chromium.

19. A coated aluminized steel sheet according to claim 17, which has an inorganic-based chromate film C with a coating amount of 100 $mg/m^2$ or less in terms of metallic chromium between said aluminizing layer and said organic resin film.

20. A coated aluminized steel sheet according to claim 19, wherein said inorganic-based chromate film C formed between said aluminizing layer and said organic resin film further contains at least one selected from the group consisting of phosphoric acid compounds, phosphonic acid and phosphonic acid salt compounds, and less than 5 parts by weight of a resin with respect to 100 parts by weight of metallic chromium.

21. A fuel tank produced with a coating aluminized steel sheet according to claim 1 above.

22. An automobile fuel tank wherein a pair of bowl-shaped bodies with flanges are integrated by continuous seam-welding of the flange substances, the automobile fuel tank being characterized in that the materials of which said bowl-shaped bodies are made are coating aluminized steel sheets which consist of aluminized steel sheets each having on one or both sides an aluminizing layer based on aluminum or an aluminum alloy containing 2–13 wt % silicon, and having a resin coating on the uppermost surface of the inner and/or outer side.

23. An automobile fuel tank according to claim 22 above, wherein said resin coating is an organic and inorganic composite chromate film consisting of a mixture of a resin and a chromic acid compound.

24. An automobile fuel tank according to claim 22 above, wherein said resin coating has a thickness of 0.1–2 $\mu$m.

25. An automobile fuel tank according to claim 22, wherein said coated aluminized steel sheets are coated aluminized steel sheets according to claim 1.

26. A seam welding process for fuel tanks, in which two coated aluminized steel sheets are combined which are aluminized steel sheets each having formed on one or both sides an aluminizing layer based on aluminum or an aluminum alloy containing 2–13 wt % silicon and having a resin coating formed on the one or both sides thereof, wherein said coated aluminized steel sheets have said aluminizing layer at least on the side corresponding to the inner side of the fuel tank, a resin film is provided on at least one of the steel sheet surfaces at the side where the steel sheets meet and/or on at least one of the steel sheet surfaces at the side where it contacts with an electrode wheel, and said two combined steel sheets are then seam welded between a pair of electrode wheels.

27. The process according to claim 26 above, wherein said resin film contains chromic acid at 10–200 mg/$m^2$ in terms of Cr.

28. The process according to claim 27 above, wherein said resin film has a thickness of 0.1–2 μm.

29. The process according to claim 26 above, wherein said resin film formed on the surface of said aluminized steel sheet is an organic/inorganic composite chromate film according to claim 1 above.

30. The process according to claim 26, wherein said coated aluminized steel sheet is a coated aluminized steel sheet according to claim 1.

* * * * *